US011042843B2

(12) United States Patent
Hentschel et al.

(10) Patent No.: US 11,042,843 B2
(45) Date of Patent: Jun. 22, 2021

(54) BENEFITS ENROLLMENT SERVER SYSTEM AND METHOD

(71) Applicant: PRINCIPAL FINANCIAL SERVICES, INC., Des Moines, IA (US)

(72) Inventors: Bruce R. Hentschel, West Des Moines, IA (US); Amanda Bjornson, West Des Moines, IA (US); Amy Friedrich, West Des Moines, IA (US); Sarah Ehlinger, Ankeny, IA (US); Tyler Matheny, Ankeny, IA (US); Anna Phelps, Waukee, IA (US); Sheri Hasan, Waukee, IA (US)

(73) Assignee: PRINCIPAL FINANCIAL SERVICES, INC., Des Moines, IA (US)

( * ) Notice: Subject to any disclaimer, the term of this patent is extended or adjusted under 35 U.S.C. 154(b) by 539 days.

(21) Appl. No.: 15/047,050

(22) Filed: Feb. 18, 2016

(65) Prior Publication Data
US 2016/0307161 A1   Oct. 20, 2016

Related U.S. Application Data

(60) Provisional application No. 62/117,812, filed on Feb. 18, 2015.

(51) Int. Cl.
*G06Q 10/10* (2012.01)
*G06Q 30/02* (2012.01)
*H04L 29/08* (2006.01)

(52) U.S. Cl.
CPC ......... *G06Q 10/1057* (2013.01); *H04L 67/02* (2013.01); *H04L 67/306* (2013.01)

(58) Field of Classification Search
CPC .. G06Q 10/105; G06Q 10/1057; H04L 67/02; H04L 67/306
USPC ................................ 705/1.1–912, 320, 322
See application file for complete search history.

(56) References Cited

U.S. PATENT DOCUMENTS

| 2002/0049617 | A1* | 4/2002 | Lencki | G06Q 30/06 705/4 |
| 2003/0028466 | A1* | 2/2003 | Jenson | G06Q 40/00 705/36 R |
| 2003/0229522 | A1* | 12/2003 | Thompson | G06Q 10/105 705/4 |
| 2006/0064313 | A1* | 3/2006 | Steinbarth | G06Q 10/10 705/322 |

(Continued)

*Primary Examiner* — Jonathan P Ouellette
(74) *Attorney, Agent, or Firm* — Goodhue, Coleman & Owens, P.C.

(57) ABSTRACT

Some embodiments include an employee benefits enrollment server system and method including operations that when executed by a computing device process and display an employee diagnosis survey with employee questions related to the employee's thoughts or attitudes to saving, insurance, investing and their financial future. The operations include accessing a diagnostics server including attributes related to financial psychology and/or behavioral economics and assigning an attribute to the employee. The operations can include displaying personalized benefits based on a profile of the employee determined by the diagnostics server based on at least one employee response to the at least one diagnostic survey and at least one of the attributes.

18 Claims, 29 Drawing Sheets

(56) References Cited

U.S. PATENT DOCUMENTS

| | | | |
|---|---|---|---|
| 2006/0248008 A1* | 11/2006 | Lind | G06Q 20/102 |
| | | | 705/40 |
| 2012/0258437 A1* | 10/2012 | Sadeh-Koniecpol | |
| | | | G06F 21/564 |
| | | | 434/362 |
| 2014/0278449 A1* | 9/2014 | Kharraz Tavakol | G06Q 10/10 |
| | | | 705/2 |
| 2014/0302470 A1* | 10/2014 | Zapantis | G09B 19/00 |
| | | | 434/236 |
| 2015/0050970 A1* | 2/2015 | Racho | G07F 17/3244 |
| | | | 463/6 |
| 2015/0178685 A1* | 6/2015 | Krumel | G06Q 10/1057 |
| | | | 705/322 |
| 2017/0147775 A1* | 5/2017 | Ohnemus | G16H 15/00 |
| 2017/0300643 A1* | 10/2017 | Bezark | G16H 20/70 |
| 2017/0308691 A1* | 10/2017 | Ruma | H04L 63/0861 |

\* cited by examiner

IDENTITY CONFIRMATION (AUTHENTICATION STEP 2)
THE USER IS ASKED SOME QUESTIONS THAT ONLY THEY CAN ANSWER, SO WE ARE CERTAIN THEY ARE WHO THEY SAY THEY ARE

PLEASE CONFIRM YOUR IDENTITY

BEFORE WE CONTINUE, WE NEED TO VALIDATE YOUR IDENTITY BECAUSE WE VALUE YOUR PERSONAL INFORMATION
⊙ WE USE A 3RD PARTY SERVICE THAT USES VARIOUS SOURCES OF PUBLIC AND FINANCIAL DATA TO FORMULATE QUESTIONS AND ANSWERS THAT ONLY YOU WOULD KNOW

WHICH OF THE FOLLOWING PEOPLE HAVE YOU KNOWN?
○ BJORN KJAR
○ ERICA OLESEN
○ HANS BECK
○ OLE JUUL
○ RONALD MICKELSON
○ I DO NOT KNOW ANY OF THE PEOPLE LISTED

IN WHICH OF THE FOLLOWING COUNTIES HAVE YOU EVER LIVED OR OWNED PROPERTY?
○ APPANOOSE, IOWA
○ BUTLER, IOWA
○ CLINTON, IOWA
○ FREMONT, IOWA
○ MONONA, IOWA
○ I HAVE NEVER LIVED IN ANY OF THESE COUNTIES

WHAT COLOR IS YOUR '1983 CHEVROLET BLAZER?
○ AMETHYST
○ BROWN
○ CHROME
○ GOLD
○ MAROON
○ I HAVE NEVER BEEN ASSOCIATED WITH THIS VEHICLE

[NEXT >]

YOUR FAMILY PAGE

THE EMPLOYEE ENTERS INFORMATION ABOUT THEIR FAMILY SO WE CAN CUSTOMIZE THEIR BENEFIT ELECTIONS

| 1 ABOUT YOU | 2 YOUR FAMILY | 3 YOUR BENEFITS | | YOUR CART | SAVE & EXIT |

NEXT, TELL US MORE ABOUT YOUR FAMILY

HELP US GIVE YOU PERSONALIZED SUGGESTIONS FOR YOU AND YOUR FAMILY. SOME OF THE BENEFITS AVAILABLE TO YOU MAY ALSO BE AVAILABLE TO YOUR SPOUSE AND DEPENDENTS. ADD THEIR INFORMATION HERE, SO THAT YOU CAN CHOOSE BENEFITS FOR THEM IN THE NEXT STEPS

DEPENDENT COVERAGE

WOULD YOU LIKE TO EVALUATE INSURANCE OPTIONS FOR DEPENDENTS (SPOUSE, DOMESTIC PARTNER, CHILDREN)? ✓YES NO

FAMILY MEMBER

| FULL NAME | RELATIONSHIP | GENDER | DATE OF BIRTH |
| SPOUSE NAME | SPOUSE ▼ | FEMALE ▼ | 01/01/1975 |

+ FAMILY MEMBER

NEXT >

FIG. 5

DENTAL INSURANCE

WHEN DENTAL IS OFFERED TO THE EMPLOYEE IT APPEARS AS THE FOLLOWING

2 DENTAL INSURANCE

- PROVIDES YOU WITH FULL OR PARTIAL COVERAGE FOR COMMON DENTAL PROCEDURES AND TREATMENTS IN ORDER TO KEEP YOUR TEETH HEALTHY
- PROVIDES PARTIAL COVERAGE FOR UNEXPECTED, HIGH COST DENTAL PROCEDURES; NOT INTENDED TO COVER 100% OF ALL DENTAL COSTS
- GIVES YOU ACCESS TO A NETWORK OF PROVIDERS WHO DISCOUNT FEES FOR SERVICES

| COVERS | BENEFIT DETAILS | AMOUNT PER PAYCHECK | SELECT ONE |
|---|---|---|---|
| YOU | $0 DEDUCTIBLE, 100% COVERAGE FOR CLEANING & EXAMS | FREE! | ADD TO CART |
| YOU & YOUR SPOUSE | $0 DEDUCTIBLE, 100% COVERAGE FOR CLEANING & EXAMS | $6.34 | ADD TO CART |
| YOU & YOUR CHILD(REN) | $0 DEDUCTIBLE, 100% COVERAGE FOR CLEANING & EXAMS | $9.96 | ADD TO CART |
| YOU & YOUR FAMILY (RECOMMENDED) | $0 DEDUCTIBLE, 100% COVERAGE FOR CLEANING & EXAMS | $17.50 | ADD TO CART |

CONTINUE >

LIFE INSURANCE ∨

FIG. 11

VISION INSURANCE

WHEN MANAGED CARE VISION IS OFFERED TO THE EMPLOYEE IT APPEARS AS THE FOLLOWING

○ 2 PAYCHECK PROTECTION ○

○ 4 VISION INSURANCE ○

- PROVIDES YOU WITH FULL OR PARTIAL COVERAGE FOR VISION EXAMS AND HARDWARE (FRAMES, LENSES, CONTACTS.) MAKING ROUTINE VISITS TO THE EYE DOCTOR LESS COSTLY
- PROVIDES PARTIAL COVERAGE FOR EXPENSIVE CONTACTS AND GLASSES; NOT INTENDED TO COVER 100% OF ALL VISION COSTS
- GIVES YOU ACCESS TO A NETWORK OF PROVIDERS WHO DISCOUNT THEIR FEES FOR SERVICES

☐ NEED MORE INFORMATION ABOUT VISION?

| COVERS | BENEFIT DETAILS | AMOUNT PER PAYCHECK | SELECT ONE |
|---|---|---|---|
| YOU | EXAMS: $10 COPAY, ONCE EVERY 12 MONTHS | $5.90 | ADD TO CART |
| YOU & YOUR SPOUSE | EXAMS: $10 COPAY, ONCE EVERY 12 MONTHS | $11.97 | ADD TO CART |
| YOU & YOUR CHILD(REN) | EXAMS: $10 COPAY, ONCE EVERY 12 MONTHS | $10.15 | ADD TO CART |
| YOU & YOUR FAMILY (RECOMMENDED) | EXAMS: $10 COPAY, ONCE EVERY 12 MONTHS | $17.29 | ADD TO CART |

CONTINUE >

DENTAL INSURANCE ^

PAYCHECK PROTECTION (SHORT TERM DISABILITY)

ENROLLMENT TOOL REFERENCES BOTH SHORT TERM AND LONG TERM DISABILITY AS "PAYCHECK PROTECTION". IN THIS EXAMPLE ONLY STD IS BEING OFFERED

| 1 ABOUT YOU | 2 YOUR FAMILY | 3 YOUR BENEFITS | | YOUR CART | SAVE & EXIT |

YOUR BENEFITS

ALL BENEFITS YOUR EMPLOYER IS PROVIDING TO YOU ARE LISTED BELOW     WANT HELP MAKING THIS DECISION?
🖩 BE SURE TO MAKE YOUR ELECTIONS BY: 08/31/2015        📞 CONTACT AN EXPERT:866-889-7278
[QUICK ELECT]  QUICKLY ELECT ALL OF THE RECOMMENDED COVERAGES FOR YOU!

1 PAYCHECK PROTECTION

- HELP PAY FOR DAILY LIVING EXPENSES YOUR PAYCHECK WOULD NORMALLY COVER
- PROTECTS YOU, YOUR FAMILY, AND YOUR HARD-EARNED PAYCHECK IF A SICKNESS OR INJURY IMPACTS YOUR ABILITY TO WORK

| PROTECTION PERIOD | BENEFIT PAYOUT* | AMOUNT PER PAYCHECK | SELECT |
|---|---|---|---|
| UP TO 14 WEEKS (RECOMMENDED) | $500 FOR 13 WEEKS | $7.15 | 🛒 ADD TO CART |

*MAY BE REDUCED BY OTHER INCOME

DO PEOPLE LIKE ME PURCHASE THIS AND USE IT?
YES: MANY PEOPLE EXPERIENCE SOME SORT OF EVENT THAT CAUSES THEM TO MISS WORK (EVEN SOMETHING AS SIMPLE AS A BACK INJURY OR PREGNANCY), AND ABOUT 2 OUT OF 3 PEOPLE FIND IT DIFFICULT TO MEET THEIR FINANCIAL OBLIGATIONS IF THEIR PAYCHECK IS DELAYED EVEN ONE WEEK

[LIFE INSURANCE ∨]

PAYCHECK PROTECTION (SHORT TERM & LONG TERM DISABILITY)

WHEN BOTH STD AND LTD ARE BOTH OFFERED, THEY DISPLAY WITHIN THE SAME SECTION AS SHOWN BELOW. A COMBINATION OF STD AND LTD COVERAGE IS REFERRED TO AS "CONTINUOUS COVERAGE"

1 PAYCHECK PROTECTION

- HELPS PAY FOR DAILY LIVING EXPENSES YOUR PAYCHECK WOULD NORMALLY COVER
- ALLOWS YOU TO CONTINUE DOING THE THINGS YOU WANT TO DO IN YOUR LIFE (FOR EXAMPLE, TRAVEL) EVEN IF YOU WERE TO SUSTAIN A SICKNESS OR INJURY THAT LIMITED YOUR ABILITY TO WORK
- PROTECTS YOU, YOUR FAMILY AND YOUR HARD-EARNED INCOME IF A SICKNESS OR INJURY IMPACTS YOUR ABILITY TO WORK, EVEN IF THE SICKNESS OR INJURY KEEPS YOU FROM WORK FOR AN EXTENDED PERIOD OF TIME
- CHOOSING BOTH OPTIONS GUARANTEES THERE IS NO GAP IN PAYCHECK PROTECTION, ASSURING YOUR FAMILY IS PROTECTED TO PURSUE THE THINGS YOU WANT TO DO

☐ HOW DOES THIS WORK UP TO 26 WEEKS?
☐ HOW DOES THIS WORK AFTER 26 WEEKS?
⊙ HOW DOES THIS BENEFIT ME OVER TIME?

| PROTECTION PERIOD | BENEFIT PAYOUT* | AMOUNT PER PAYCHECK | SELECT |
|---|---|---|---|
| STD<br>UP TO 26 WEEKS | 60% OF YOUR PAY, $624 PER WEEK | $5.18 + | 🛒 ADD TO CART |
| LTD<br>AFTER 26 WEEKS, UP TO NORMAL RETIREMENT AGE | 60% OF YOUR PAY, $2,704 PER MONTH | $1.77 = | 🛒 ADD TO CART |
| CONTINUOUS COVERAGE UP TO NORMAL RETIREMENT AGE<br>(RECOMMENDED) BOTH | 60% OF YOUR PAY, UP TO 26 WEEKS, FOLLOWED BY 60% OF YOUR PAY | $6.95 | 🛒 ADD TO CART |

*MAY BE REDUCED BY OTHER INCOME

LIFE INSURANCE ∨

FIG. 15

SHOPPING CART

A SUMMARY OF ALL THE BENEFITS THAT WERE SELECTED ARE SHOWN IN A FAMILIAR SHOPPING CART EXPERIENCE. THE USER CAN SELECT THE "MODIFY" BUTTON OR "DELETE" BUTTON TO MAKE CHANGES FROM THIS PAGE

| 1 ABOUT YOU | 2 YOUR FAMILY | 3 YOUR BENEFITS | YOUR CART | SAVE & EXIT |

YOUR BENEFITS SHOPPING CART

GREAT WORK, AJDIN! YOU'VE ALMOST COMPLETED YOUR BENEFITS FOR THIS YEAR! CLICK THE 'I CONFIRM' BUTTON BELOW TO CONFIRM YOUR CHOICES

THERE ARE A FEW QUICK STEPS REQUIRED ON THE NEXT PAGE TO MAKE SURE YOU TAKE FULL ADVANTAGE OF YOUR BENEFITS. YOUR FUTURE SELF WILL THANK YOU!

| PRODUCT NAME — 1605 | COVERED PERSON | BENEFIT DETAILS — 1607 | AMOUNT PER PAYCHECK — 1609 | — 1611 |
|---|---|---|---|---|
| LIFE INSURANCE | YOU | $60,000 | $32.70 | ☑ ☒ |
| LIFE INSURANCE | YOUR SPOUSE | $30,000 | $3.06 | ☑ ☒ |
| LIFE INSURANCE | YOUR CHILD(REN) | $10,000 | $2.00 | ☑ ☒ |
| EMPLOYER PAID LIFE INSURANCE | YOU | $75,000 | FREE! | |
| DENTAL INSURANCE | YOU | PPO | $32.45 | ☑ ☒ |
| VISION INSURANCE | YOU & YOUR FAMILY | EXAMS | $17.29 | ☑ ☒ |

BENEFITS LISTED AS "FREE!" ARE BEING PROVIDED TO YOU AT YOUR EMPLOYER'S EXPENSE

TOTAL $87.50 PER PAYCHECK

[I CONFIRM]

FIG. 16

ELECTRONIC STATEMENT OF HEALTH

AFTER THE USER CONSENTS TO SUBMIT THEIR BENEFIT ELECTIONS, IF THEY HAVE SELECTED AN AMOUNT OVER THE VTL GI, THEY WILL SEE THE FOLLOWING PROMPT. IF THEY ARE WITHIN THE APPROVED HEIGHT AND WEIGHT RATIO, AND ANSWER POSITIVELY TO THE SCREENING QUESTIONS, THEY WILL BE APPROVED. THE WORDING/TERMINOLOGY USED IS STATE SPECIFIC

HEALTH QUESTIONS (FLORIDA EXAMPLE) ×

YOU

YOU ARE CURRENTLY APPROVED FOR $70,000 OF LIFE INSURANCE. A FEW, QUICK HEALTH QUESTIONS ARE REQUIRED TO BE CONSIDERED FOR THE $30,000 OF COVERAGE YOU'VE CHOSEN

HEIGHT [ ▼ ] FT [ ▼ ] IN
HEIGHT [   ] LBS

[ YES | NO ] ARE YOU PLANNING OR SCHEDULED FOR HOSPITALIZATION, SURGERY, MEDICAL TREATMENT, THERAPY, COUNSELING, MEDICAL TESTS, OR TAKING ANY MEDICINE?

[ YES | NO ] IN THE LAST 10 YEARS, HAVE YOU TESTED POSITIVE FOR EXPOSURE TO HIV INFECTION OR BEEN DIAGNOSED AS HAVING OR ARC OR AIDS CAUSED BY THE HIV INFECTION?

[ YES | NO ] IN THE LAST 5 YEARS, HAVE YOU HAD SURGERY, BEEN HOSPITALIZED OR CONSULTED WITH A DOCTOR, HAD BLOOD OR OTHER DIAGNOSTIC TESTS OR BEEN ADVISED TO RECEIVE MEDICAL TREATMENT OR BEEN DIAGNOSED OR RECEIVED TREATMENT FOR ANY OF THE FOLLOWING:

- CANCER
- TUMOR(S)
- HEART OR CIRCULATORY DISORDER
- STROKE
- ALCOHOL/DRUG USE
- DIABETES
- LIVER DISORDER
- KIDNEY/URINARY DISORDER
- MUSCLE DISORDER
- MULTIPLE SCLEROSIS/ NEUROLOGICAL DISORDER
- DIGESTIVE DISORDER
- BONE/JOINT DISORDER
- RESPIRATORY DISORDER
- INFERTILITY
- SKIN/EYES/EAR/ NOSE/THROAT DISORDER
- GLAND DISORDER
- PSYCHOLOGICAL/MENTAL DISORDER
- BLOOD DISORDER
- HEPATITIS
- ORGAN OR OTHER TRANSPLANTS
- HIGH BLOOD PRESSURE

☐ I REPRESENT THAT THE INFORMATION, STATEMENTS, AND ANSWERS ON THIS FORM ARE TRUE TO THE BEST OF MY KNOWLEDGE. (SEE MORE)

[ SUBMIT ]

FIG. 17

FORMS PAGE
THE USER IS PROMPTED TO FILL OUT REQUIRED FORMS. THE BENEFICIARY FORM IS AVAILABLE ONLINE

YOUR ENROLLMENT IS ALMOST COMPLETE
YOUR ENROLLMENT HAS BEEN RECEIVED. THERE IS JUST A LITTLE MORE INFORMATION WE NEED FROM YOU

FORMS

YOU HAVE ELECTED A BENEFIT THAT REQUIRES US TO GATHER A LITTLE MORE INFORMATION ABOUT YOU
THE FOLLOWING FORM(S) HAVE BEEN EMAILED TO YOU ALONG WITH A COPY OF YOUR BENEFITS. PLEASE PRINT
FROM YOUR EMAIL OR PRINT HERE, COMPLETE, AND MAIL IN

HEALTH QUESTIONS FORM ⊙     🖨 PRINT

BENEFICIARY DESIGNATION FORM ⊙     🖨 PRINT

☐ COMPLETE ONLINE     NEXT >

FIG. 18

WRAP-UP PAGE

THE BENEFIT ELECTION PROCESS IS COMPLETE. AN OPTIONAL SURVEY IS ON THIS PAGE THAT THE EMPLOYEE CAN FILL OUT AND GIVE US FEEDBACK TO MAKE THE SYSTEM BETTER

GREAT WORK, JOHNNY! YOU FINISHED!

YOUR CONFIRMATION HAS BEEN EMAILED TO YOU, WITH A LINK TO THE FORMS BELOW FOR YOUR CONVENIENCE.

📅 10/01/15 BENEFITS WILL TAKE EFFECT

TELL US WHAT YOU THINK

TAKE 30 SECONDS TO LET US KNOW HOW YOUR ELECTIONS EXPERIENCE WAS

WAS THIS PROCESS EASY TO COMPLETE?
| YES | NO |

DID THIS PROCESS ACCOMPLISH WHAT YOU SET OUT TO DO?
| YES | NO |

ANY OTHER COMMENTS?

[SUBMIT COMMENTS]

FIG. 19

YOUR BENEFIT ELECTIONS HAVE BEEN RECEIVED AND YOUR ENROLLMENT IS ALMOST COMPLETE!

PLEASE COMPLETE THE ATTACHED FORMS(S) AND RETURN THEM TO THE ADDRESS LISTED ON EACH FORM. IF YOU HAVE ALREADY PRINTED AND/OR SUBMITTED THE FORM(S) THERE ARE NO ADDITIONAL REQUIRED STEPS

PLEASE REVIEW YOUR ELECTIONS BELOW AND KEEP A COPY FOR YOUR RECORDS

| PRODUCT NAME | COVERED PERSON | BENEFIT DETAILS | AMOUNT PER PAYCHECK |
|---|---|---|---|
| PAYCHECK PROTECTION | YOU | UP TO 26 WEEKS | FREE! |
| PAYCHECK PROTECTION | YOU | AFTER 26 WEEKS | $6.53 |
| LIFE INSURANCE | YOU | $80,000 | $6.42 |
| LIFE INSURANCE | YOUR SPOUSE | $50,000 | $4.02 |
| LIFE INSURANCE | YOUR CHILD(REN) | $10,000 | $0.92 |
| EMPLOYER PAID LIFE INSURANCE | YOU | $25,000 | FREE! |
| DENTAL INSURANCE | YOU & YOUR SPOUSE | PPO | $23.68 |
| VISION INSURANCE | YOU & YOUR SPOUSE | EXAMS AND MATERIALS | $7.80 |
| TOTAL | | | $49.37 PER PAYCHECK |

YOUR BENEFITS WILL GO INTO EFFECT ON 08/01/15 PROVIDED YOU MEET REQUIREMENTS UNDER EACH COVERAGE. FOR COMPLETE DETAILS OF ALL BENEFITS, REQUIREMENTS AND RESTRICTIONS, PLEASE REFER TO YOUR BOOKLET OR CONTACT YOUR EMPLOYER. BENEFITS LISTED AS "FREE!" ARE BEING PROVIDED TO YOU AT YOUR EMPLOYERS EXPENSE

FIG. 20

YOUR BENEFITS

ALL BENEFITS YOUR EMPLOYER IS PROVIDING TO YOU ARE LISTED BELOW

📅 BE SURE TO MAKE YOUR ELECTIONS BY: 12/31/2020

1 PAYCHECK PROTECTION (DISABILITY INSURANCE)

- HELPS TO PROVIDE YOU WITH MONEY FOR THE THINGS THAT YOU WOULD NORMALLY BUY WITH YOUR PAYCHECK.
- ENHANCES THE ABILITY FOR YOU TO CONTINUE ENJOYING LIFE YOU WANT IF A SICKNESS OR INJURY PREVENTS YOU FROM WORKING.
- PROTECTION IS AVAILABLE IF A LONG-TERM SICKNESS OR SERIOUS INJURY PREVENTS YOU FROM WORKING FOR AN EXTENDED PERIOD OF TIME.
- CHOOSING BOTH OPTIONS GUARANTEES THERE IS NO GAP IN PAYCHECK PROTECTION, ASSURING YOUR CONTINUED ENJOYMENT OF THE LIFE YOU WANT.

| PROTECTION PERIOD | BENEFIT PAYOUT* | AMOUNT PER PAYCHECK | SELECT |
|---|---|---|---|
| UP TO 26 WEEKS (SHORT-TERM) | 60% OF YOUR PAY, $240 PER WEEK | $3.99 | |
| AFTER 26 WEEKS, UP TO NORMAL RETIREMENT AGE (LONG-TERM) | 60% OF YOUR PAY, $1,040 PER MONTH | $2.32 | |
| CONTINUOUS COVERAGE UP TO NORMAL RETIREMENT AGE (RECOMMENDED) | 60% OF YOUR PAY, UP TO 26 WEEKS, FOLLOWED BY 60% OF YOUR PAY | $6.31 | ⊟ REMOVE FROM CART |

*MAY BE REDUCED BY OTHER INCOME

WANT TO REVIEW YOUR SELECTION WITH SOMEONE?
📞 CONTACT A BENEFITS EXPERT: 866-889-7278

LIFE INSURANCE ⌄

FIG. 21

YOUR BENEFITS

ALL BENEFITS YOUR EMPLOYER IS PROVIDING TO YOU ARE LISTED BELOW
BE SURE TO MAKE YOUR ELECTIONS BY: 12/31/2020

1 LIFE INSURANCE

YOU
- PROVIDES AN OPTIONAL LIFE INSURANCE BENEFIT TO HELP SUPPLEMENT OTHER LIFE INSURANCE POLICIES YOU MAY HAVE PURCHASED (OR THAT MAY HAVE BEEN PAID FOR BY YOUR EMPLOYER, LIKE BASIC LIFE INSURANCE)
- BENEFITS ARE PAID TO YOUR BENEFICIARIES AT THE TIME OF YOUR DEATH
- HELPS YOUR FAMILY TO BE FINANCIALLY COMFORTABLE IN THE ABSENCE OF YOUR INCOME
- INCLUDES COVERAGE THAT PROVIDES MONEY FOR ACCIDENTS THAT RESULT IN DEATH, PARALYSIS, OR LOSS OF SPEECH AND/OR HEARING

NEED MORE INFORMATION ABOUT LIFE INSURANCE?
HOW DOES THIS BENEFIT ME OVER TIME?

| BENEFIT DETAILS | AMOUNT PER PAYCHECK |
|---|---|
| $5,000 (RECOMMENDED) | $7.93 |

CUSTOMIZE YOUR BENEFIT

WANT TO ADD COVERAGE FOR YOUR FAMILY MEMBERS? UPDATE YOUR FAMILY
EMPLOYER PAID LIFE INSURANCE

2 PAYCHECK PROTECTIO

SELECT ONE
ADD TO CART

WANT TO CONSULT WITH AN ADVISOR?
CONSULT AN ADVISOR: 866-889-7278

YOUR CART | SAVE & EXIT

1 ABOUT YOU | 2 YOUR FAMILY | 3 YOUR BENEFITS

FIG. 22

| 1 ABOUT YOU | 2 YOUR FAMILY | 3 YOUR BENEFITS: |

ALL BENEFITS YOUR EMPLOYER IS PROVIDING TO YOU ARE LISTED BELOW
BE SURE TO MAKE YOUR ELECTIONS BY: 12/31/2020

[QUICK ELECT] QUICKLY ELECT ALL OF THE RECOMMENDED COVERAGES FOR YOU!

1 PAYCHECK PROTECTION (DISABILITY INSURANCE)

- HELPS PAY FOR DAILY LIVING EXPENSES YOUR PAYCHECK WOULD NORMALLY COVER.
- PROTECTS YOU, YOUR FAMILY, AND YOUR HARD-EARNED INCOME IF A SICKNESS OR INJURY IMPACTS YOUR ABILITY TO WORK, EVEN IF THE SICKNESS OR INJURY KEEPS YOU FROM WORK FOR AN EXTENDED PERIOD OF TIME.
- CHOOSING BOTH OPTIONS GUARANTEES THERE IS NO GAP IN PAYCHECK PROTECTION, ASSURING DAILY LIVING EXPENSES ARE TAKEN CARE OF.

| PROTECTION PERIOD | BENEFIT PAYOUT* | AMOUNT PER PAYCHECK | SELECT |
|---|---|---|---|
| UP TO 26 WEEKS (SHORT-TERM) (RECOMMENDED) | 60% OF YOUR PAY, $240 PER WEEK | $3.99 | |
| AFTER 26 WEEKS, UP TO NORMAL RETIREMENT AGE (LONG-TERM) | 60% OF YOUR PAY, $1,040 PER MONTH | $2.32 | |
| CONTINUOUS COVERAGE UP TO NORMAL RETIREMENT AGE | 60% OF YOUR PAY, UP TO 26 WEEKS, FOLLOWED BY 60% OF YOUR PAY | $6.31 | REMOVE FROM CART |

*MAY BE REDUCED BY OTHER INCOME

DO PEOPLE LIKE ME PURCHASE BOTH OF THESE AND USE THEM
YES: MANY PEOPLE EXPERIENCE SOME SORT OF EVENT THAT CAUSES THEM TO MISS WORK (SOMETHING AS SIMPLE AS BACK INJURY OR PREGNANCY OR MORE SERIOUS SUCH AS A CAR ACCIDENT OR STROKE), AND ABOUT 2 OUT OF 3 PEOPLE FIND IT DIFFICULT TO MEET THEIR FINANCIAL OBLIGATIONS IF THEIR NEXT PAYCHECK IS DELAYED FOR EVEN ONE WEEK. PURCHASING BOTH OPTIONS MEANS YOUR PAYCHECK IS PROTECTED NO MATTER WHAT TYPE OF INJURY OR SICKNESS PREVENTS YOU FROM WORKING.

2 LIFE

FIG. 24

BENEFITS ENROLLMENT SERVER SYSTEM AND METHOD

RELATED APPLICATIONS

This application claims priority from Provisional Application No. 62/117,812, filed on Feb. 18, 2015, the entire contents of which are incorporated herein by reference.

BACKGROUND

Employer provided benefits (dental, vision, life, disability, critical illness, etc.) are valuable components of an employee's total benefits package. Employees are usually encouraged to enroll in one or more group employee benefits using a paper or online process when they join an organization, and oftentimes are required to re-enroll in one or more benefits following a life change event, or when completing an annual enrollment process. In general, however, online benefit enrollment systems do not cater to differences between each employee's financial preferences, purchasing characteristics, and outlook. Furthermore, these systems are typically not customized to encourage a participation behavior that would be in the best interest of the employee. This inflexible model is usually reflected in the user interfaces of online enrollment systems, many of which are overly complex, time consuming, and difficult to navigate.

SUMMARY

Some embodiments include an employee benefits server system comprising a computing device comprising at least one processor, and a non-transitory computer readable medium, having stored thereon, instructions that when executed by the computing device, cause the computing device to perform operations where at least some of the operations occur within a local system or consumer device. The operations comprise associating the local system or consumer device with a benefits provider device, where the benefits provider device includes at least a benefits server and a diagnostic analysis database. Further, the operations include execution of a browser program to deliver personalized benefits information within a website delivered on the local system or consumer device, where the browser program displays at least one employee diagnostic survey. The operations further include enabling retrieval of benefits related input from a user using at least a wired communication interface or a wireless communication interface. The benefits input is based on the content of the at least one employee diagnostic survey and comprises employee preferences for saving, investing, insurance, and their financial future entered into the local system or consumer device. Further, the operations include causing the benefits server to access persona for the employee from the diagnostic analysis database, where the persona is selected by the benefits server from a plurality of predetermined individualized attributes based at least in part on at least a portion of the benefits related input. The individualized attributes identify a generalized profile of personal and financial characteristics. The operations also include enabling retrieval of employee dependent information through the local system or consumer device using at least a wired communication interface or a wireless communication interface. Further, the operations also include causing the benefits server to display at least one benefits election webpage on the local system or consumer device. The at least one benefits election webpage includes the personalized benefits information based at least in part on the benefits server processing at least a portion of the benefits related input and employee persona to determine at least one employee benefit.

Some embodiments include associating the local system or consumer device with a benefits provider device that includes executing a two-step authentication process of the employee based on information provided by the employee. In some further embodiments, the two-step authentication includes processing a login of a user on the local system or consumer device using at least a wired communication interface or a wireless communication interface. Some embodiments further include processing identification information provided by the user. Some embodiments of the invention include accessing an employee database and processing an identification match of the user with at least one employee record confirming the user as an employee. Some further embodiments include coupling to at least one remote or non-local 3rd party database server and processing a test of authentication of the employee using background information from the 3rd party database server. Other embodiments include a pre-enrollment email communication to the user that precedes the login of the user.

In some embodiments, the diagnostic analysis database comprises profile determination data from at least one financial psychologist or financial psychology organization. In some further embodiments, the attributes comprise or are related to at least one of a financial psychology and behavioral economics. Some embodiments include attributes that include employee profile determination data from at least one behavioral economist or behavioral economist organization.

In some embodiments, the at least one benefits election webpage includes at least one nudge based at least in part on the determined employee's persona, where the at least one nudge configured and arranged to at least partially influence the employee's selection of at least one benefit. In some further embodiments, the at least one nudge comprises at least one of a sound, a verbal announcement, a display of text, and a display of graphics. In other embodiments, the at least one nudge is based at least in part on an analysis of different clusters of benefit inputs or personas from other employees.

In some further embodiments of the invention, the website includes a display of an employer dashboard that is configured and arranged to enable an employer to manage an employee's enrollment in substantially real time. In some further embodiments, the employer dashboard is configured and arranged to enable an employer to manage an employee's enrollment in substantially real time. In other embodiments, the employer dashboard includes a measure of the employees that have completed benefit enrollment, employees that completed benefit enrollment, and/or employees that have not initiated benefit enrollment. In further embodiments, the employer dashboard is configured and arranged to enable an employer to send an acknowledgment or congratulations to employees that have completed enrollment. In some further embodiments, the employer dashboard is configured and arranged to enable an employer to send an encouragement message to employees that have partially completed and delayed completion of benefit enrollment. In some other embodiments, the employer dashboard is configured and arranged to enable an employer to send an announcement to employees that have not started enrollment.

In some embodiments, the at least one employee diagnostic survey comprises a surveyance of demographics, financial resources, assets and obligations, insurance product ownership, and/or investment product ownership. In some further embodiments, the at least one employee diagnostic survey comprises questions related to the employees savings for retirement, financial advisor image, lifestyle characteristics, preferences for information delivery style, and/or attitudes regarding finances.

In some further embodiments, the at least one benefits election webpage comprises benefits information or elections related to life insurance, paycheck protection, dental insurance, and/or vision insurance. In some embodiments, the paycheck protection comprises short-term disability insurance and/or long-term disability insurance.

Some further embodiments of the invention include operations that cause the benefits server to display an employee health survey, and enable retrieval of employee health information through the local system or consumer device using at least a wired communication interface or a wireless communication interface.

DESCRIPTION OF THE DRAWINGS

FIG. 3B shows a display image of the login portion of an online employee benefits enrollment server system and method in accordance with some embodiments of the invention.

FIG. 4A illustrates a display image of an identity confirmation portion of an online employee benefits enrollment server system and method in accordance with some embodiments of the invention.

FIG. 4B shows a display image of the employee diagnostic portion of an online employee benefits enrollment server system and method in accordance with some embodiments of the invention.

FIG. 5 illustrates a display image of the family page portion of an online employee benefits enrollment server system and method in accordance with some embodiments of the invention.

FIG. 11 illustrates an employee benefits related display image for dental benefits in accordance with some embodiments of the invention.

FIG. 12 illustrates an employee benefits related display image for vision benefits in accordance with some embodiments of the invention.

FIG. 13 shows a display image of a benefits selection portion of an online employee benefits enrollment server system and method including paycheck protection options in accordance with some embodiments of the invention.

FIG. 15 shows a display image of a benefits selection portion of an online employee benefits enrollment server system and method including paycheck protection benefits for long and short term disability in accordance with some embodiments of the invention.

FIG. 16 illustrates a display image of benefits information and selection portion of an online employee benefits enrollment server system and method including a benefits shopping cart in accordance with some embodiments of the invention.

FIG. 17 illustrates a display image of benefits information and selection portion of an online employee benefits enrollment server system and method including health questions in accordance with some embodiments of the invention.

FIG. 18 illustrates a display image of a benefits selection confirmation forms page portion of the online employee benefits enrollment server system and method in accordance with some embodiments of the invention.

FIG. 19 shows a display image of a portion of a benefits information wrap-up and survey page of the online employee benefits enrollment server system and method in accordance with some embodiments of the invention.

FIG. 20 shows a communication showing benefits information provided by the online employee benefits enrollment server system and method to a user in accordance with some embodiments of the invention.

FIG. 21 illustrates a benefits summary for a first profile employee of the online employee benefits enrollment server system and method in accordance with some embodiments of the invention.

FIG. 22 illustrates a benefits summary for a second profile employee of the online employee benefits enrollment server system and method in accordance with some embodiments of the invention.

FIG. 24 illustrates a benefits summary for a fourth profile employee of the online employee benefits enrollment server system and method in accordance with some embodiments of the invention.

DETAILED DESCRIPTION

Figure 1A:
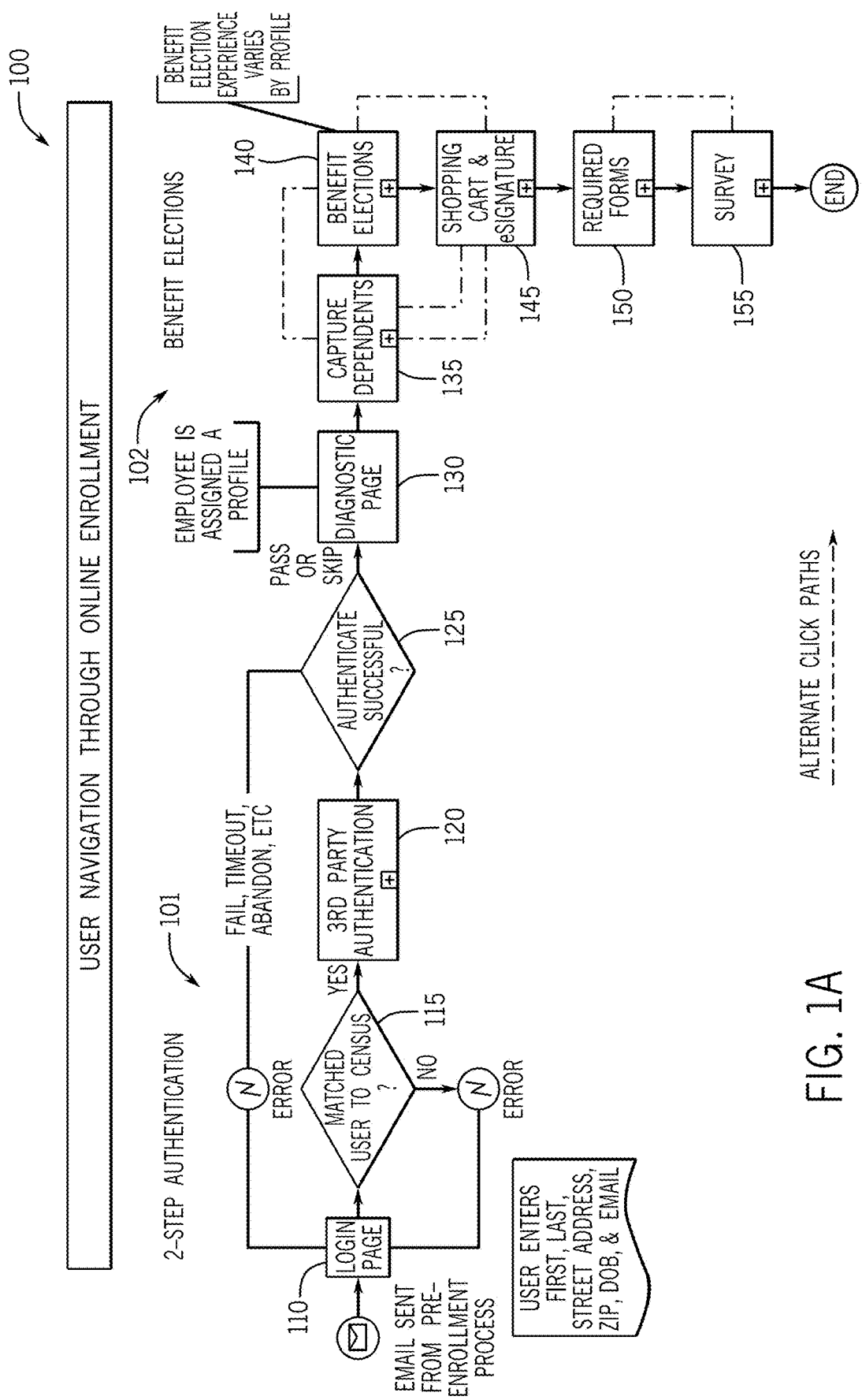
FIG. 1A provides an overview of an online employee benefits enrollment server system and method according to one embodiment of the invention.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives that fall within the scope of embodiments of the invention.

Some embodiments of the invention can include an employee benefits enrollment server system and method that operates online through the world-wide-web, and/or through a local area online network such as an intranet. In some embodiments, the online employee benefits enrollment server system and method can create an online enrollment experience for group employee benefits. The types of benefits that can be presented to an employee through the online employee benefits enrollment server system and method include, but are not limited to, dental insurance, vision care insurance, life insurance, disability insurance, and insurance in the event of critical illness, etc.

In some embodiments of the invention, the online employee benefits enrollment server system and method can create an experience customized to each employee's attitudes toward money and their finances. Some embodiments include embedded nudges based on the discipline of behavioral economics in order to encourage an employee's participation and purchase behavior that would be of the most benefit to the employee. Some embodiments of the online employee benefits enrollment server system and method can employ the use of both a financial psychologist and a behavioral economist to develop the experience. For example, a financial psychologist can provide detail for determining classification of individuals, and a behavioral economist can provide detail for determining appropriate nudges for each classification.

In some embodiments of the invention, the online employee benefits enrollment server system and method can provide one or more streamlined insurance recommendations for each individual user. Furthermore, some embodiments of the online employee benefits enrollment server system and method can provide a user experience with all available benefit choices displayed and accessible in one place (e.g., through a graphical user interface) while providing the user with an on-line shopping type of experience.

FIG. 1A provides an overview 100 of an online employee benefits enrollment server system and method 100 according to one embodiment of the invention. In summary, in some embodiments, the user navigation can include a series of steps through which the user can navigate including two-step authentication processes 101 and benefit election processes 102. In some embodiments, the two-step authentication processes 101 can include a login page 110, user match process 115, authentication 120, verify authentication 125, and diagnostic page 130 processes or steps. In some embodiments, an email can be sent from a pre-enrollment process to enable a user to initiate a login process. In some embodiments, a user can provide some identity information, and user match process 115, authentication 120, verify authentication 125 processes can be performed to verify a user is an employee. In some embodiments of the invention, at a diagnostic page process 130, a user profile can be assigned. In some embodiments, benefit election processes 102 can include capture dependents 135, benefit elections 140, shopping cart and e-signature 145, required forms step 150, and survey step 155. Some details of displayed images for these steps are shown in at least FIGS. 3A-19, and described in detail below.

Some embodiments of the invention include an employer dashboard that can enable the employer to manage (in real or substantially real time) the progress of their employee's enrollment activity. Some embodiments include an employer dashboard that can enable employers to see how many employees have completed the enrollment process, how many have started but didn't finish, how many never started, etc., and can then allow the employer to send reminders to groups of employees who fall into those categories. Some embodiments can enable the employer to send a note to those who completed the process acknowledging and/or saying thanks and/or congratulations for successfully completing the process, or a note to those employees who have not completed their enrollment with a reminder to enroll and the deadline for enrolling. For example, FIG. 1C provides an employer dashboard summary view in according with some embodiments of the invention. In some embodiments, the employer dashboard 200 can include steps or processes 205, authenticate processes 210, roles and access assignment 215, and employer list view 220. Dashboard processes flows are shown as "Team 2/SST" 230, "Call center" 240, "Sales office" 250, employer's dashboard 280, "broker?" 260, and employer 270. Dashboard processes include employer's dashboard 280 (from "Sales office" 250 processes) and employer's dashboard 290 (from "broker?" 260, and employer 270).

Figure 1B:
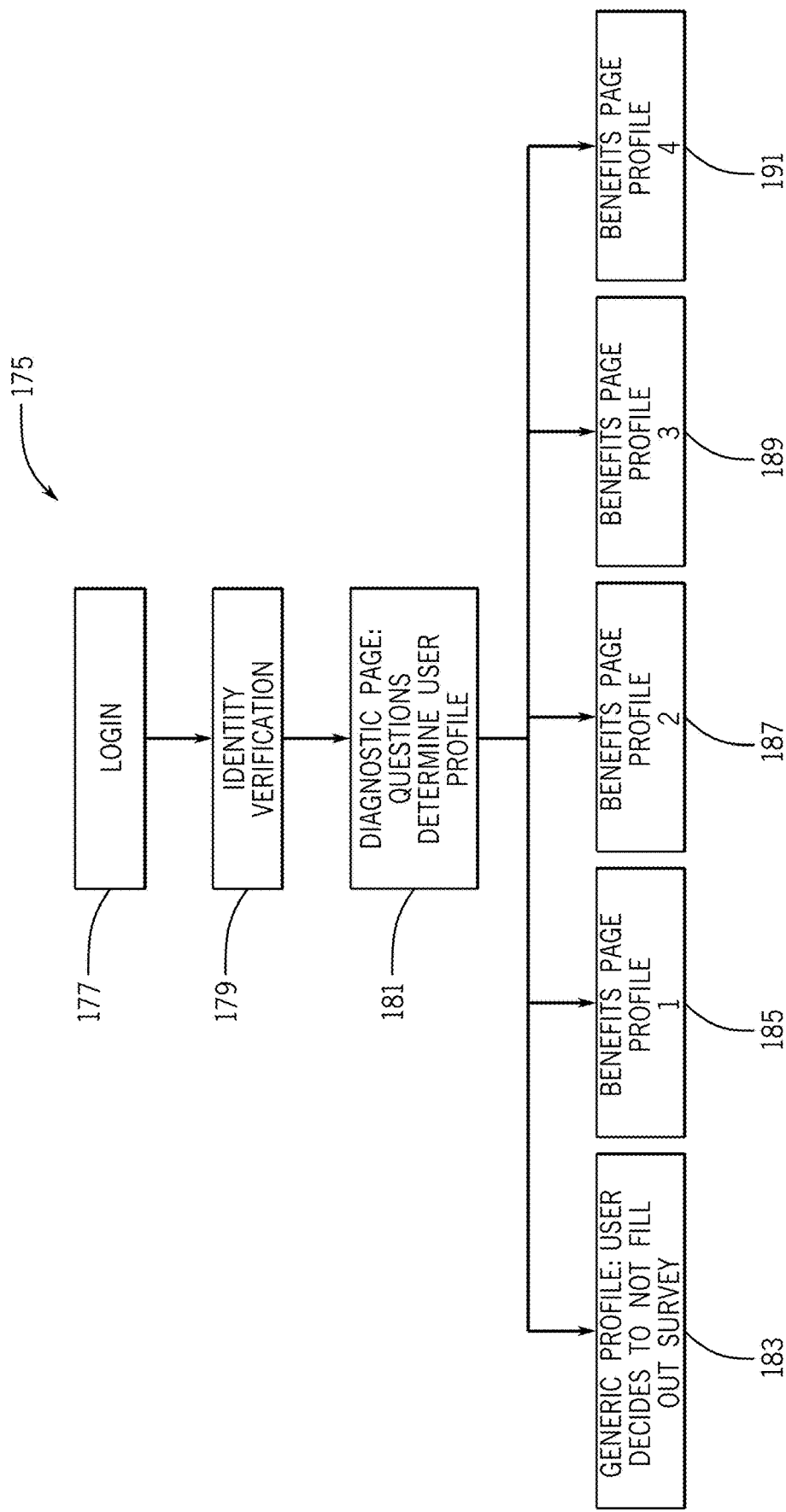
FIG. 1B illustrates a process flow summary of the online employee benefits enrollment server system and method according to one embodiment of the invention.
Figure 1C:
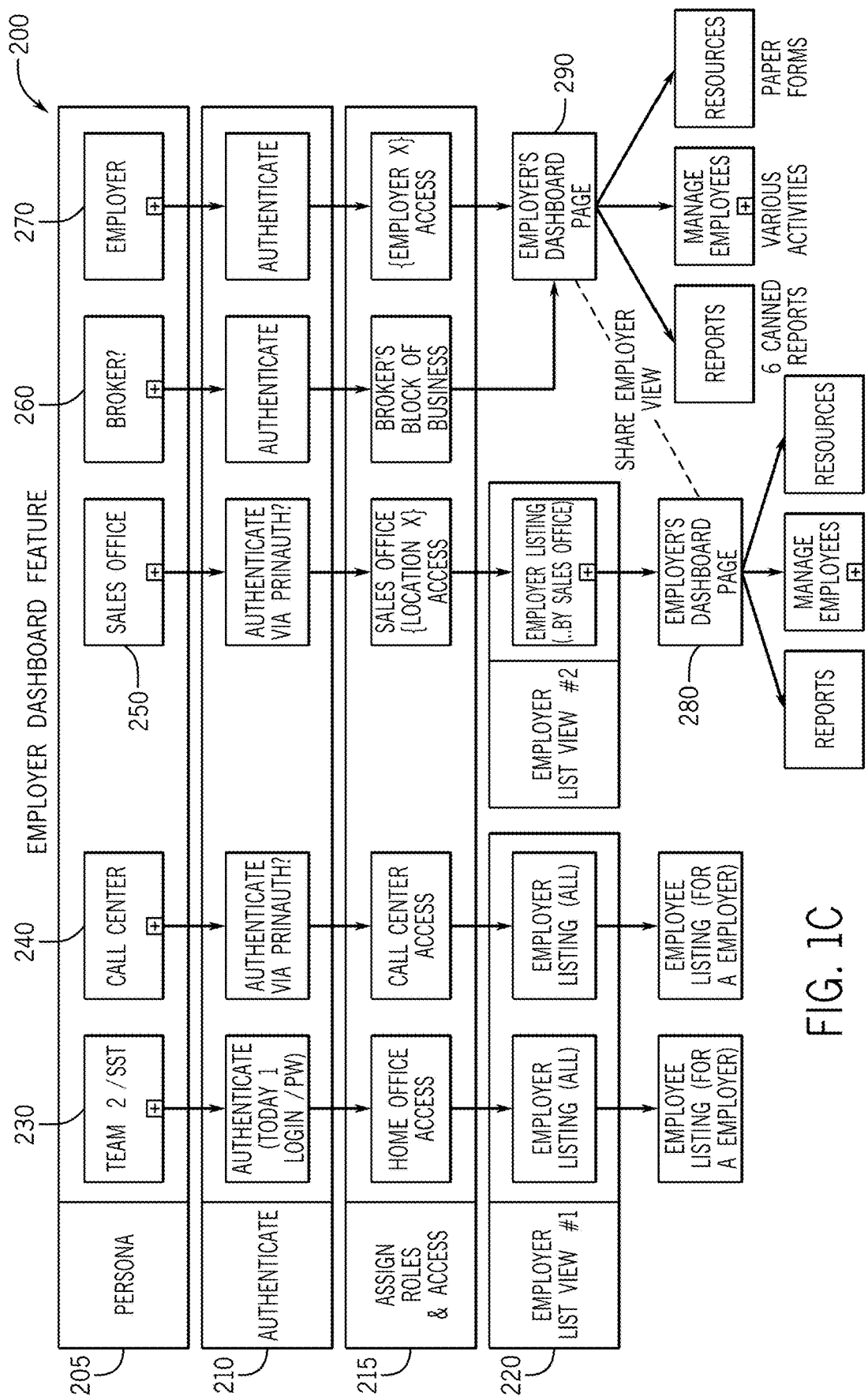
FIG. 1C provides an employer dashboard summary view in according with some embodiments of the invention.

FIG. 1B illustrates a process flow summary 175 of the online employee benefits enrollment server system and method 100 according to one embodiment of the invention. In some embodiments, following a login process 177, the user's identity can be verified using an identify verification process 179. In some embodiments, once identified, the user can be evaluated using the diagnostic process 181. In some embodiments, if the user chooses not to proceed with a diagnostic survey, a generic profile 183 can be created. Once a user completes the diagnosis survey, the user can be directed to a benefits page for one or more profiles. For example, once a user completes the diagnosis survey, the user can be directed to a benefits page 185 for a profile (e.g., a first profile). In some embodiments, once a user completes the diagnosis survey, the user can be directed to a benefits page 187 for a profile (e.g., a second profile). In some further embodiments, once a user completes the diagnosis survey, the user can be directed to a benefits page 189 for a profile (e.g., a third profile). In some other embodiments, once a user completes the diagnosis survey, the user can be directed to a benefits page 191 for a profile (e.g., a fourth profile). In some embodiments, the online employee benefits enrollment server system and method 100 can include a generic profile and four profiles as depicted in process flow summary 175. In some embodiments of the invention, the generic profile can be defined or labeled as a profile "0". Further, in some embodiments, the first, second, third, and fourth profiles can be defined or labeled as a profile "1", profile "2", profile "3", and profile "4" respectively. The definition of the profiles described herein should be considered non-limiting examples. In some other embodiments of the invention, the online employee benefits enrollment server system and method 100 can include profiles with different descriptors. Further, in some embodiments, the online employee benefits enrollment server system and method 100 can include more or less numbers of profiles than those described herein. For example, in some embodiments, the online employee benefits enrollment server system and method 100 can include three or less profiles. In some further embodiments, the online employee benefits enrollment server system and method 100 can include five or more profiles.

Figure 1D:
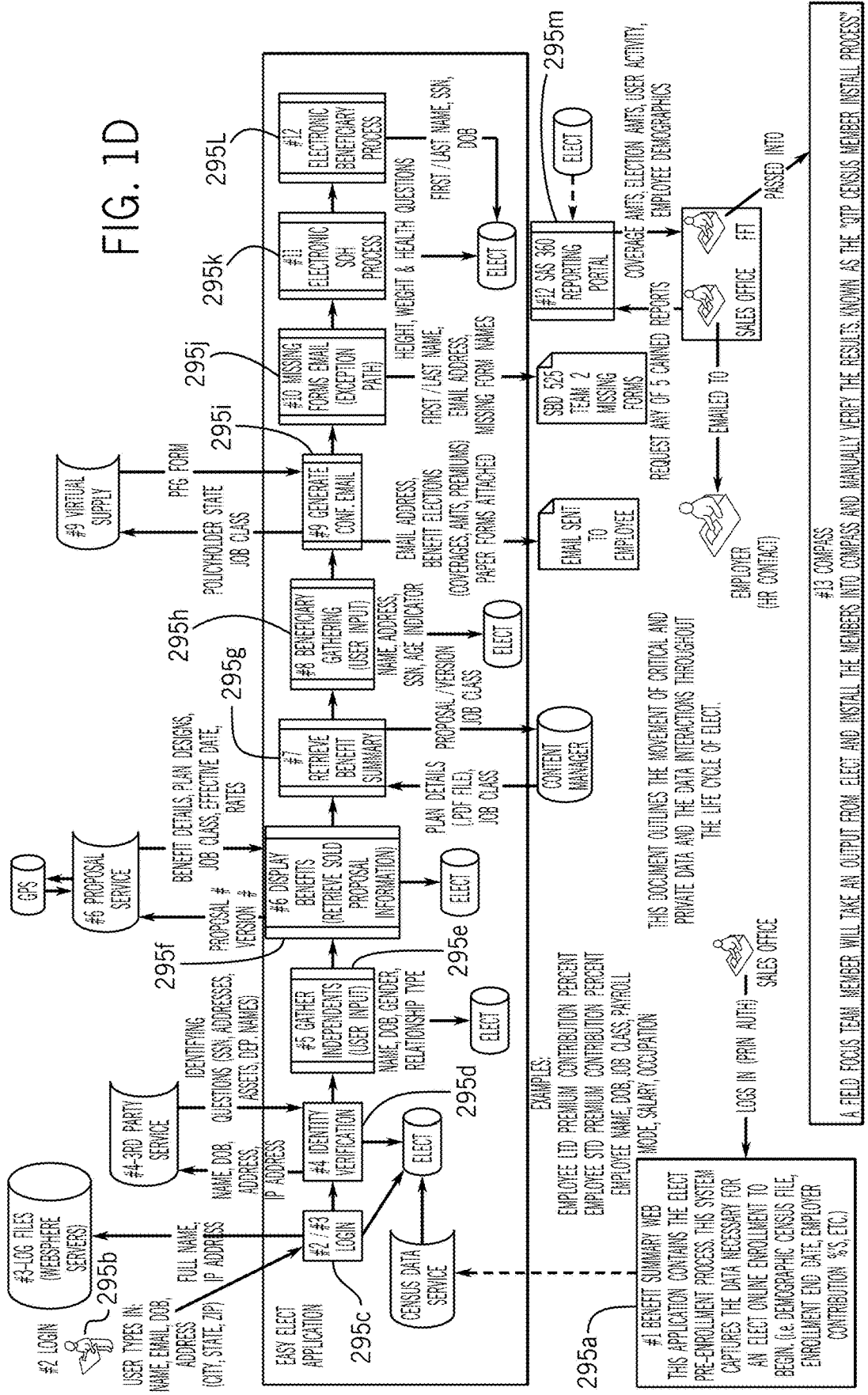
FIG. 1D provides a detailed process flow of data and data interactions of the online employee benefits enrollment server system and method according to one embodiment of the invention

FIG. 1D provides a detailed process flow 295 of data and data interactions of the online employee benefits enrollment server system and method 100 according to one embodiment of the invention. The various processes shown and described below include access of data from a user and/or at least one database. In some embodiments, benefit summary web application 295*a* can process pre-enrollment, capturing data necessary to enroll a user (e.g., such as demographic census file, enrollment end date, employer contribution percentages, etc.). A user login process 295*b* can process a user login with login step 295*c*, and proceed to identity verification 295*d*. In some embodiments, gather dependents step 295*e* can process input from a user related to dependent information, and a display benefits 295*f* can display proposed benefits to the user. In some embodiments, the online employee benefits enrollment server system and method 100 can process a retrieve benefit summary 295*g* and retrieve associated beneficiary information through user input 295*h*. In some embodiments, the online employee benefits enrollment server system and method 100 can process email process confirmation 295*i* and email path 295*j*, electronic sqh process 295*k*, and electronic beneficiary process 295*l*, and reporting portal 295*m*, providing reporting procedures of user benefits.

Figure 2:
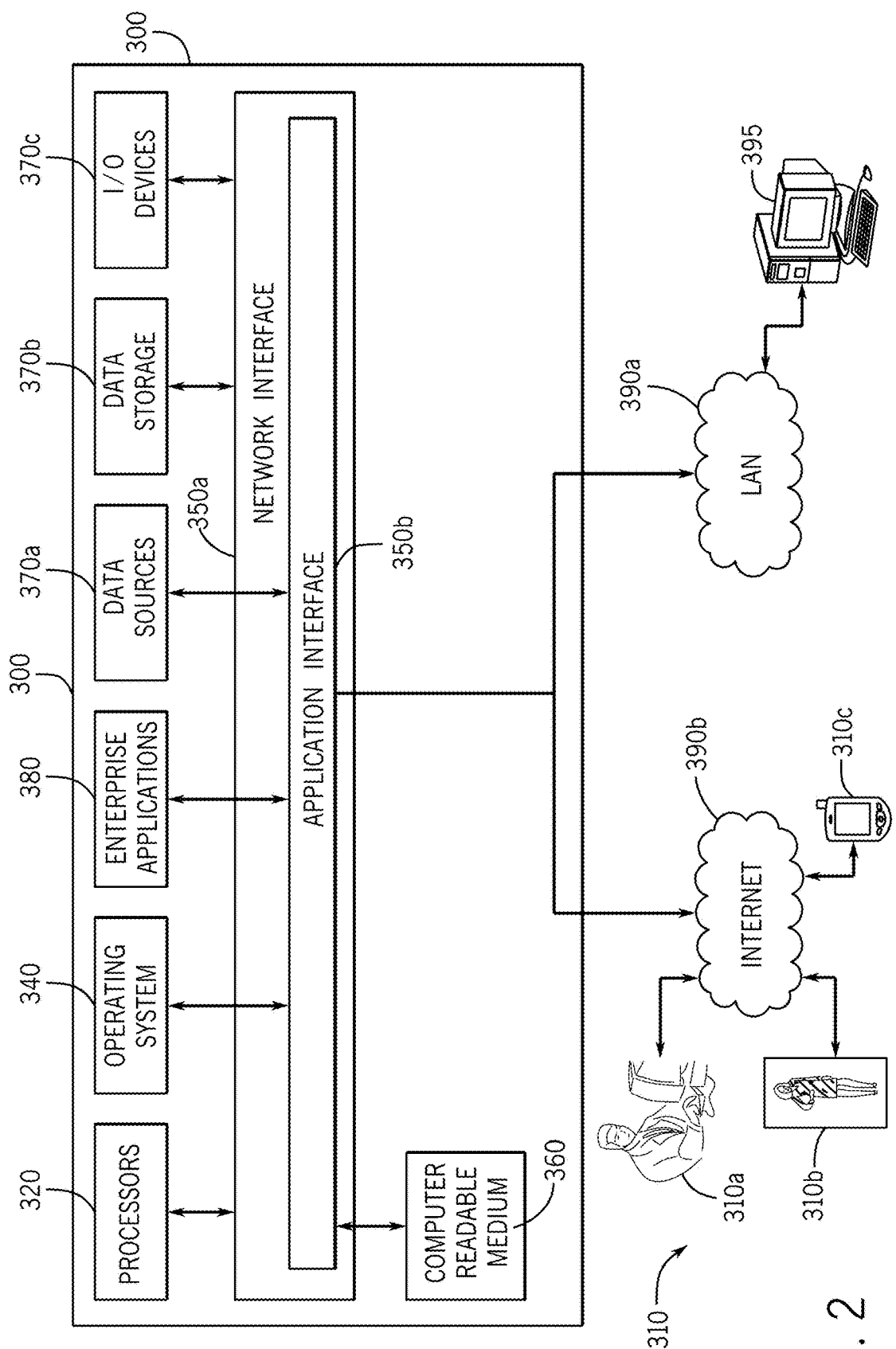
FIG. 2 depicts a system for operating the employee benefits enrollment server system and method according to one embodiment of the invention.

FIG. 2 depicts a system 300 for operating the employee benefits enrollment server system and method 100 according to one embodiment of the invention. As shown, the system 300 can include at least one computing device, including at least one or more processors 320. Some processors 320 can include processors 320 residing in one or more conventional server platforms. The system 300 can include a network interface 350*a* and an application interface 350*b* coupled to at least one processors 320 capable of running at least one operating system 34. Further, the system 30 can include a network interface 350*a* and an application interface 350*b* coupled to at least one processors 320 capable of running one or more of the software modules (e.g., enterprise applications 380). The software modules 380 can include server-based software platform that can include online employee benefits enrollment server system and method software modules suitable for hosting at least one user account and at least one client account, as well as transferring data between one or more accounts (e.g., between a provider device such as a server comprising at least one or more processors 320 and one or more local systems or user devices.

In some embodiments, the system 300 can comprise at least one computing device including at least one processor 320. In some embodiments, the at least one processor 320 can include a processor residing in or coupled to one or more server platforms. In some embodiments, the system 300 can include a network interface 350*a* and an application interface 350*b* coupled to the least one processor 320 capable of processing at least one operating system 340. Further, in some embodiments, the interfaces 350*a*, 350*b* coupled to at least one processor 320 can be configured to process one or more of the software modules (e.g., such as enterprise applications 380). In some embodiments, the software modules 380 can include server-based software that can include online employee benefits enrollment server system and method software modules. In some embodiments, the software modules 380 can operate to host at least one user account and/or at least one client account, and operating to transfer data between one or more of these accounts using the at least one processor 320.

With the above embodiments in mind, it should be understood that the invention can employ various computer-implemented operations involving online employee benefits enrollment server system and method data stored in computer systems. Moreover, the above-described databases and models throughout the online employee benefits enrollment server system and method 100 can store analytical models and other data on computer-readable storage media within the system 300 and on computer-readable storage media coupled to the system 300. In addition, the above-described applications of the online employee benefits enrollment server system and method system can be stored on computer-readable storage media within the system 300 and on computer-readable storage media coupled to the system 300. These operations are those requiring physical manipulation of physical quantities. Usually, though not necessarily, these quantities take the form of electrical, electromagnetic, or magnetic signals, optical or magneto-optical form capable of being stored, transferred, combined, compared and otherwise manipulated. In some embodiments of the invention, the system 300 can comprise at least one computer readable medium 360 coupled to at least one data source 370*a*, and/or at least one data storage device 370*b*, and/or at least one input/output device 370*c*. In some embodiments, the invention can be embodied as computer readable code on a computer readable medium 360. In some embodiments, the computer readable medium 360 can be any data storage device that can store data, which can thereafter be read by a computer system (such as the system 300). In some embodiments, the computer readable medium 360 can be any physical or material medium that can be used to tangibly store the desired information or data or instructions and which can be accessed by a computer or processor 320. In some embodiments, the computer readable medium 360 can include hard drives, network attached storage (NAS), read-only memory, random-access memory, FLASH based memory, CD-ROMs, CD-Rs, CD-RWs, DVDs, magnetic tapes, other optical and non-optical data storage devices. In some embodiments, various other forms of computer-readable media 360 can transmit or carry instructions to a computer 395 and/or at least one user (such as user 310), including a router, private or public network, or other transmission device or channel, both wired and wireless.

The software modules 380 can be configured to send and receive data from a database (e.g., from a computer readable medium 360 including data sources 370a and data storage 370b that can comprise a database), and data can be received by the software modules 380 from at least one other source. In some embodiments, at least one of the software modules 380 can be configured within the system to output data to at least one user 310 via at least one graphical user interface rendered on at least one digital display. In some embodiments, any of the aforementioned users can comprise user 310.

In some embodiments of the invention, the computer readable medium 360 can be distributed over a conventional computer network via the network interface 350a where the online employee benefits enrollment server system and method system embodied by the computer readable code can be stored and executed in a distributed fashion. For example, in some embodiments, one or more components of the system 300 can be coupled to send and/or receive data through a local area network ("LAN") 390a. In some further embodiments, the networks 390a, 390b can include wide area networks ("WAN"), direct connections (e.g., through a universal serial bus port), or other forms of computer-readable media 360, or any combination thereof.

In some embodiments, components of the networks 390a, 390b can include any number of local systems or user devices (e.g., consumer devices) such as personal computer 395 including for example desktop computers, and/or laptop computers, or any fixed, generally non-mobile internet appliances coupled through the LAN 390a. In some embodiments, personal computer 395 coupled through the LAN 390a can be configured for any type of user including an administrator. In some further embodiments, one or more components of the system 300 can be coupled to send or receive data through an internet 390b (e.g., a wireless internet). For example, some embodiments include at least one user 310 coupled wirelessly and accessing one or more software modules of the online employee benefits enrollment server system and method system including at least one enterprise application 380 via an input and output ("I/O") device 370c. In some other embodiments, the system 300 can enable at least one user 310 to be coupled to access enterprise applications 380 via an I/O device 37c through LAN 390a. In some embodiments, the user 310 can comprise a user 310a coupled to the system 300 using a desktop computer, and/or laptop computers, or any fixed, generally non-mobile internet appliances coupled through the internet 390b. In some further embodiments, the user 310 can comprise a mobile user 310b coupled to the system 300. In some embodiments, the user 310b can use any mobile computing device 310c that can be wirelessly coupled to the system 300, including, but not limited to, personal digital assistants, and/or cellular phones, mobile phones, or smart phones, and/or pagers, and/or digital tablets, and/or fixed or mobile internet appliances.

In some embodiments, the system 300 can enable one or more users 310 coupled to receive, analyze, input, modify, create and send data to and from the system 300, including to and from one or more enterprise applications 380 running on the system 300. In some embodiments, at least one software application 380 running on one or more processors 320 can be configured to be coupled for communication over networks 390a, 390b through the internet 390b. In some embodiments, one or more wired or wirelessly coupled components of the network 390a, 390b can include one or more resources for data storage. For example, this can include any other form of computer readable media in addition to the computer readable media 360 for storing information, and can include any form of computer readable media for communicating information from one electronic device to another electronic device.

Figure 3A:
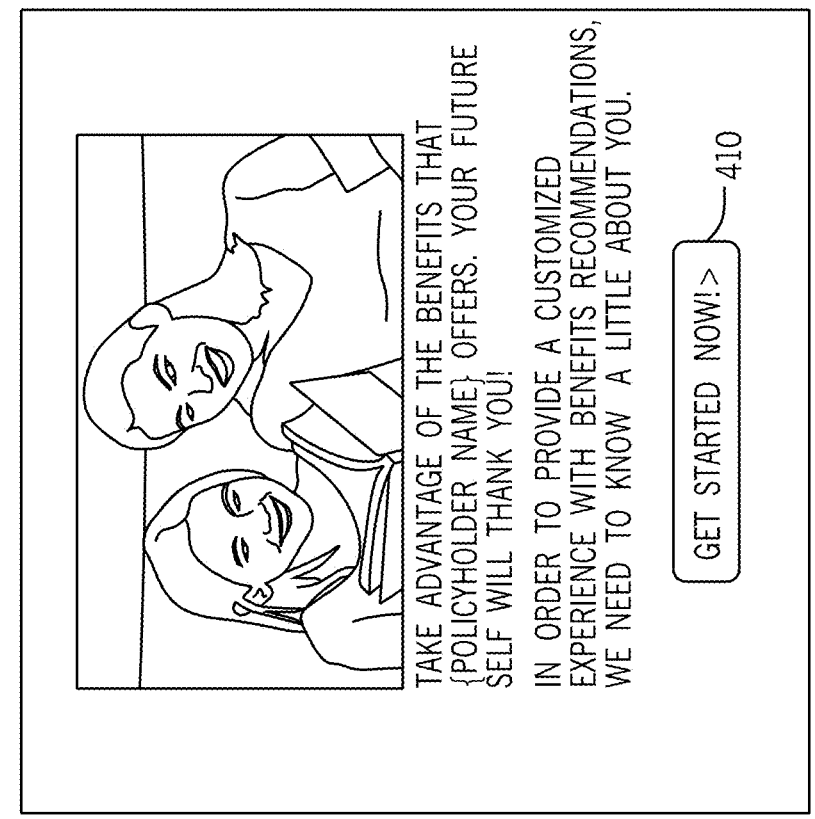
FIG. 3A illustrates a display image of an email of a start page portion of an online employee benefits enrollment server system and method in accordance with some embodiments of the invention.

FIG. 3A illustrates a display image 400 of an email of a start page portion of an online employee benefits enrollment server system and method 100 according to one embodiment of the invention. In some embodiments of the invention, the online employee benefits enrollment server system and method 100 can prepare a start page that can be accessed by a user 310 such as an employee. In some embodiments, the online employee benefits enrollment server system and method 100 can prepare and send a start page email communication to at least one user 310. In other embodiments, the user 310 can access the start page online (e.g. by accessing a portion of the online employee benefits enrollment server system and method 100 through a local system or consumer device) using a computer device such as a personal computer, computer terminal, a laptop computer, or through a mobile computing device such as a computer tablet or smart phone (e.g., such as the those described earlier with respect to system 300 shown in FIG. 2). In some embodiments, the start page can include one or more communications comprising textural and/or graphical information related to employee benefits. Further, in some embodiments, the start page can include at least one user selectable access option (e.g., illustrated as icon 410) to enable a user 310 to access more information and/or to initiate an online employee benefits enrollment server system and method 100.

In some embodiments, a user 310 (e.g., an employee) can enter and access features of the online employee benefits enrollment using a login process. For example, FIG. 3B shows a display image 425 of the login portion of an online employee benefits enrollment server system and method 100 according to one embodiment of the invention. In some embodiments, the logon process can include entering a user's personal information using an entry window 435. For example, in some embodiments, using entry window 435, the user 310 can enter the user's name, name and home address, date of birth, and/or email address. In some other embodiments, other personal information can enable a user 310 to logon to the online employee benefits enrollment server system and method 100. In some embodiments, following completion of the entry window 435, a user 310 can logon to the online employee benefits enrollment server system and method 100 using a logon icon 437.

In some embodiments, the online employee benefits enrollment server system and method 100 can include one or more security protocols to screen and check potential users of the online employee benefits enrollment server system and method 100. For example, FIG. 4A illustrates a display image 445 of an identity confirmation portion of an online employee benefits enrollment server system and method 100 according to one embodiment of the invention. In some embodiments, the online employee benefits enrollment server system and method 100 can include one or more identity questions or statements coupled with at least two displayed answers from which a user 310 can select an answer to the displayed question or statement. In the example embodiment shown in FIG. 4A, three identity questions or statements (shown as 445a, 445b, 445c), each with six multiple choice answers can be provided to the user 310. In other embodiments, the identity questions or statements 445a, 445b, 445c can include more or less than six multiple choice answers. In some embodiments, the questions or statements and answers can be derived from a database coupled to the online employee benefits enrollment server system and method 100. In some embodiments, questions and answers are derived from a 3$^{rd}$ party source. In some embodiments, the total number of questions or statements and associated answers can vary. For example, in some embodiments, the online employee benefits enrollment server system and method 100 can use more than three sets of questions or statements and answers to assist in determining and verifying the identity of the user 310. In some other embodiments (not illustrated), a user 310 can be issued with a username and password that can be used to enter the online employee benefits enrollment server system and method 100.

In some embodiments of the invention, the online employee benefits enrollment server system and method 100 can classify one or more users. In order to classify an individual's attitudes or preferences, the online employee benefits enrollment server system and method 100 can deploy at least one diagnostic survey. In some embodiments, the survey can measure demographics, financial resources, assets and obligations, insurance product ownership, and investment product ownership. In some embodiments, the survey can measure other financial behaviors, such as preferences for saving for retirement, preferences for selection and/or the use of life insurance products, preferences for financial advisor usage, lifestyle characteristics, preferences for information delivery style, and attitudes or preferences about finances.

In some embodiments, in order to determine key factors, a nationwide sample of employees can be surveyed, including United States residents working for companies with 5 to 500 employees, and those who are offered at least one group, non-medical insurance employee benefit by their employer. The first step in the analytic process can include the gathering of 70 attitudinal statements, where a factor analysis can be run on each in order to reduce the number of items included in the diagnostic question set. In some embodiments, the six key factors can include "Best Deal", "Optimism", "Spontaneity", "Cognition", "Self-direction", and "Obligation." In some other embodiments of the invention, the online employee benefits enrollment server system and method 100 can include more or less numbers of key factors than those described herein. For example, in some embodiments, the online employee benefits enrollment server system and method 100 can include five or less key factors. In some further embodiments, the online employee benefits enrollment server system and method 100 can include seven or more key factors. Further, in some embodiments, the key factors can comprise different types or descriptors than those described.

The second step in the analytic process can include a cluster analysis using the six factors to see how many different "clusters" or profiles of employees emerged. This can be used to determine if there were groups of employees who had similar attitudes related to their finances. The result can include four profiles including "Spontaneous Intuitives" that comprised those who need easy decisions, look at the "promotion" aspect of a product/service, and need to see an immediate benefit of the product/service. "Savvy self-reliants" included those that liked options to choose from, and seek various points of view, but want to make their own decisions, and want to make quick decisions if possible (i.e. they are highly spontaneous). "Mindful Planners" included those that need numerous reasons to buy a product/service, seek a lot of information about the product/service, and do not like to be rushed. "Simplicity Seekers" included those that look for the opinions of others, endorsements or reviews, require assistance and reassurance and looking for best deal/best price.

In some other embodiments of the invention, the online employee benefits enrollment server system and method 100 can include a cluster analysis using more or less numbers of key factors than those described herein. For example, in some embodiments, the online employee benefits enrollment server system and method 100 can use five or less key factors in the analysis. In some further embodiments, the online employee benefits enrollment server system and method 100 can include seven or more key factors in the analysis. Further, in some embodiments, the resultant profiles can comprise different types or descriptors than those described herein. Moreover, in some embodiments, the online employee benefits enrollment server system and method 100 can include more or less numbers of profile assignments than the four described above. For example, in some embodiments, the online employee benefits enrollment server system and method 100 can include three or less profile assignments. In some further embodiments, the online employee benefits enrollment server system and method 100 can include five or more profile assignments.

In order to gain a picture of the clusters or profiles, the clusters can be correlated with all the other variables on the survey for persona development. This can help to describe the people who fell into each cluster based on key demographics such as age, asset levels, etc. and behavioral measures such as their likelihood to rely on the help of financial professionals, or their inclination to own investment products and save for retirement.

Some embodiments include behavioral economics (herein after "BE") integration capable of persona development and customization of specialized nudges. BE combines the fields of psychology and economics to better understand how people make decisions and the forces that impact those decisions. One basic premise of BE is that it makes people better off, as judged by themselves. Some embodiments can be designed to incorporate nudges to get employees to make the "right" choice the easy choice while not forbidding any options. Therefore, within the enrollment process, the election of products can be specifically ordered to have users focus on the benefits they need versus the benefits they want. In some embodiments, the nudge can comprise a sound such as a sound effect, and/or music, and/or vocals, and/or a verbal announcement such as a male or female recorded or synthesized voice, and/or a visual announcement such as a display of text, and/or a display of graphics, or a combination thereof.

Some embodiments of the invention also recommend specific benefit options to nudge users into making the "right" selection. BE is typically considered a one size fits all approach to help make broad environmental changes, which is in stark contrast to many embodiments of the invention.

In some embodiments, the online employee benefits enrollment server system and method 100 can customize the nudges based on different clusters or personas. In some embodiments, the specific customization by persona can include a spontaneous intuitive persona with characteristics such as their being motivated by speed, needing easy decisions, liking promotion-related benefits, being motivated by immediate benefits and/or they trust their gut or instincts. In some embodiments, nudges specific to them can include an outline of the benefits of each product, removing references to "protecting your family" in product descriptions as these individuals have a low sense of obligation to others. Some other embodiments include auto-enrollment of benefits for at least some users.

Some embodiments can include savvy and self-reliant persona characteristics that include being motivated by speed but confident in their own ability, and include individuals who are most likely to consult with a financial professional, and are motivated by wanting to have a sense of control in making their decisions. At the same time, they are not opposed to consulting an advisor, motivated by gains (product language tells of the gains received with each product), and more likely to buy if they are given options. In some embodiments, nudges specific to them can include a focus on providing additional information on cost/benefits, provide link to additional information, and offer a connection to a financial advisor. Auto-enrollment of benefits is typically not a good option as these individuals want to make the decision themselves.

Some embodiments can include mindful planner personas who take their time and read all options, and may want a help option for thinking through the options. These individuals want reasons to buy and prefer a more complete process and picture. They are oriented towards more of a protection mindset rather than growth mindset. In some embodiments, nudges for these individuals include focus on the protection provided by each product and protecting family, providing extra information to allow user to ready through all the plan details, setting higher benefit amounts on product recommendations, and offering help through a contact number or online chat. An auto-enrollment of benefits is typically not a good option for these types of individuals as they prefer think through all decisions, generally do not want the decisions made for them.

Some embodiments can include simplicity seeker personas that include individuals seeking security and preventing loss, are characterized by wanting to get a good deal, and do not like to make decisions. They are high procrastinators and have a low sense of efficacy. They lack confidence, and like options for helping them along the way. In some embodiments, nudges can include focus on the preventive benefits of all products and overall costs, focus on a statement about people like them, and providing the ability to reach out to someone for help. An auto-enrollment in benefits is typically a good option for these individuals. Further, a quick elect path is also typically a good option to eliminate a long decision process.

Figure 4B:
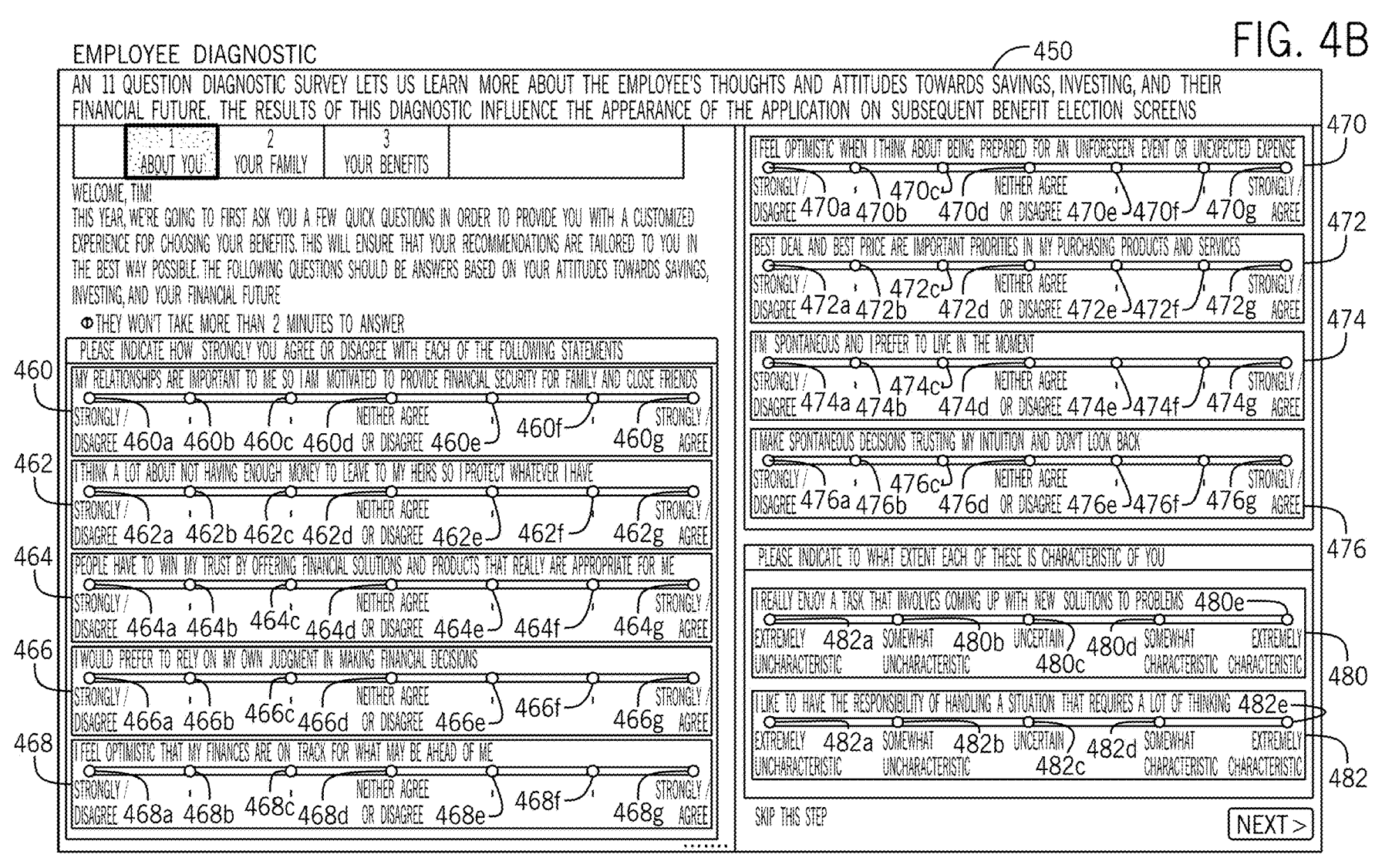

FIG. 4B shows a display image 450 of the employee diagnostic portion of an online employee benefits enrollment server system and method 100 according to one embodiment of the invention. In some embodiments, the diagnostic survey (shown as diagnostic page step process in FIG. 1A) can comprise an introduction header describing the function and purpose of the diagnostic survey to the user 310. The user 310 can be presented with a display including a plurality of diagnostic questions or statements (for simplicity, referred to herein as questions), each with an associated response bar. Further, in some embodiments, each response bar can include a scale of agreement and disagreement ranging from strongly agree to strongly disagree, and including a neither agree not disagree option. Further, in some embodiments, each response bar can comprise a plurality of user-selectable stepped positions on the response bar. In other embodiments, a continuous slider bar can be used. In some embodiments, a diagnostic question 460 can comprise "my relationships are important to me so I am motivated to provide financial security for family and close friends". In some embodiments, a diagnostic question 462 can comprise "I think a lot about not having enough money to leave to my heirs so I protect whatever I have". In some embodiments, a diagnostic question 464 can comprise "people have to win my trust by offering financial solutions and products that really are appropriate for me". In some embodiments, a diagnostic question 466 can comprise "I would prefer to rely on my own judgment in making financial decisions". In some embodiments, a diagnostic question 468 can comprise "I feel optimistic that my finances are on track for what may be ahead of me". In some embodiments, a diagnostic question 470 can comprise "I feel optimistic when I think about being prepared for an unforeseen event or unexpected expense". In some embodiments, a diagnostic question 472 can comprise "best deal and best price are important priorities". In some embodiments, a diagnostic question 474 can comprise "I'm spontaneous and I prefer to live in the moment". In some embodiments, a diagnostic question 476 can comprise "I make spontaneous decisions trusting my intuition and don't look back".

Some embodiments include questions requesting the user 310 indicate to what extent one or more statements serves to characterize the user 310. For example, in some embodiments, a diagnostic question 480 can comprise "I really enjoy a task that involves coming up with new solutions to problems". In some embodiments, a diagnostic question 482 can comprise "I like to have the responsibility of handling a situation that requires a lot of thinking". In this instance, the online employee benefits enrollment server system and method 100 can provide the user 310 with a display including a plurality of diagnostic questions, each with an associated response bar. Further, in some embodiments, each response bar can comprise a plurality of user-selectable stepped positions on the response bar. In some embodiments, each response bar can include a user-selectable scale of level of characteristic ranging from extremely uncharacteristic to extremely characteristic, and including an uncertain selector. In other embodiments, a continuous slider bar can be used for selection of the level of characteristic.

In some embodiments of the invention, by using the response bar indicating the scale of agreement and disagreement, a user 310 can select from a plurality of user-selectable stepped positions on the response bar using display image 450 of the employee diagnostic portion of an online employee benefits enrollment server system and method 100. In some embodiments, for diagnostic question 460, the user 310 can select from three main responses, 460*a* (strongly/disagree), 460*d* (neither agree nor disagree), and 460*g* (strongly agree). Responses that fall between the main responses can include a response 460*b*, where the user 310 is indicating the response is closer to response 460*a* than response 460*d*, or a response 460*c*, where the user 310 is indicating a response that is closer to response 460*d* than response 460*a*. Similarly, responses that fall between the main responses can include a response 460*e*, where the user 310 is indicating the response is closer to response 460*d* than response 460*g*, or a response 460*f*, where the user 310 is indicating a response that is closer to response 460*g* than response 460*d*.

In some embodiments, for diagnostic question 462, the user 310 can select from three main responses, 462*a* (strongly/disagree), 462*d* (neither agree nor disagree), and 462*g* (strongly agree). In some embodiments, responses that fall between the main responses can include a response 462*b*, where the user 310 is indicating the response is closer to response 462*a* than response 462*d*, or a response 462*c*, where the user 310 is indicating a response that is closer to 462*d* than response 462*a*. Similarly, responses that fall between the main responses can include a response 462e, where the user 310 is indicating the response is closer to response 462d than response 462g, or a response 462f, where the user 310 is indicating a response that is closer to response 462g than response 462d.

In some embodiments, for diagnostic question 464, the user 310 can select from three main responses, 464a (strongly/disagree), 464d (neither agree nor disagree), and 464g (strongly agree). Responses that fall between the main responses can include a response 464b, where the user 310 is indicating the response is closer to response 464a than response 464d, or a response 464c, where the user 310 is indicating a response that is closer to response 464d than response 464a. Similarly, responses that fall between the main responses can include a response 464e, where the user 310 is indicating the response is closer to response 464d than response 464g, or a response 464f, where the user 310 is indicating a response that is closer to response 464g than response 464d.

In some embodiments, for diagnostic question 466, the user 310 can select from three main responses, 466a (strongly/disagree), 466d (neither agree nor disagree), and 466g (strongly agree). Responses that fall between the main responses can include a response 466b, where the user 310 is indicating the response is closer to response 466a than response 466d, or a response 466c, where the user 310 is indicating a response that is closer to response 466d than response 466a. Similarly, responses that fall between the main responses can include a response 466e, where the user 310 is indicating the response is closer to response 466d than response 466g, or a response 466f, where the user 310 is indicating a response that is closer to response 466g than response 466d.

In some embodiments, for diagnostic question 468, the user 310 can select from three main responses, 468a (strongly/disagree), 468d (neither agree nor disagree), and 468g (strongly agree). Responses that fall between the main responses can include a response 468b, where the user 310 is indicating the response is closer to response 468a than response 468d, or a response 468c, where the user 310 is indicating a response that is closer to response 468d than response 468a. Similarly, responses that fall between the main responses can include a response 468e, where the user 310 is indicating the response is closer to response 468d than response 468g, or a response 468f, where the user 310 is indicating a response that is closer to response 468g than response 468d.

In some embodiments, for diagnostic question 470, the user 310 can select from three main responses, 470a (strongly/disagree), 470d (neither agree nor disagree), and 470g (strongly agree). Responses that fall between the main responses can include a response 470b, where the user 310 is indicating the response is closer to response 470a than response 470d, or a response 470c, where the user 310 is indicating a response that is closer to response 470d than response 470a. Similarly, responses that fall between the main responses can include a response 470e, where the user 310 is indicating the response is closer to response 470d than response 470g, or a response 470f, where the user 310 is indicating a response that is closer to response 470g than response 470d.

In some embodiments, for diagnostic question 472, the user 310 can select from three main responses, 472a (strongly/disagree), 472d (neither agree nor disagree), and 472g (strongly agree). Responses that fall between the main responses can include a response 472b, where the user 310 is indicating the response is closer to response 472a than response 472d, or a response 472c, where the user 310 is indicating a response that is closer to response 472d than response 472a. Similarly, responses that fall between the main responses can include a response 472e, where the user 310 is indicating the response is closer to response 472d than response 472g, or a response 472f, where the user 310 is indicating a response that is closer to response 472g than response 472d.

In some embodiments, for diagnostic question 474, the user 310 can select from three main responses, 474a (strongly/disagree), 474d (neither agree nor disagree), and 474g (strongly agree). Responses that fall between the main responses can include a response 474b, where the user 310 is indicating the response is closer to response 474a than response 474d, or a response 474c, where the user 310 is indicating a response that is closer to response 474d than response 474a. Similarly, responses that fall between the main responses can include a response 474e, where the user 310 is indicating the response is closer to response 474d than response 474g, or a response 474f, where the user 310 is indicating a response that is closer to response 474g than response 474d.

In some embodiments, for diagnostic question 476, the user 310 can select from three main responses, 476a (strongly/disagree), 476d (neither agree nor disagree), and 476g (strongly agree). Responses that fall between the main responses can include a response 476b, where the user 310 is indicating the response is closer to response 476a than response 476d, or a response 476c, where the user 310 is indicating a response that is closer to response 476d than response 476a. Similarly, responses that fall between the main responses can include a response 476e, where the user 310 is indicating the response is closer to response 476d than response 476g, or a response 476f, where the user 310 is indicating a response that is closer to response 476g than response 476d.

In some embodiments, the online employee benefits enrollment server system and method 100 can select or calculate a profile of a user 310 based on selected responses to any one of the questions 460, 462, 464, 466, 468, 470, 472, 474, 476, 480, or 482. Further, in some embodiments, the online employee benefits enrollment server system and method 100 can modify displayed benefits or the content of any of the displays or windows disclosed herein based on response to any of the questions 460, 462, 464, 466, 468, 470, 472, 474, 476, 480, or 482.

In some embodiments, the online employee benefits enrollment server system and method 100 can select or calculate a first profile of a user 310 defined as "spontaneous intuitives". In this instance, the online employee benefits enrollment server system and method 100 can calculate and apply the profile based on a user's entry of a response 460e to question 460, and/or response 462c to question 462, and/or response 464f to question 464, and/or response 466e to question 466, and/or response 468d to question 468, and/or response 470d to question 470, and/or response 472f to question 472, and/or response 474e to question 474, and/or response 476d to question 476, and/or response 480d to question 480, and/or response 482d to question 482.

In some embodiments, the online employee benefits enrollment server system and method 100 can select or calculate a second profile of a user 310 defined as "savy self-reliants". In this instance, the online employee benefits enrollment server system and method 100 can calculate and apply the profile based on a user's entry of a response 460e to question 460, and/or response 462f to question 462, and/or response 464e to question 464, and/or response 466e to question 466, and/or response 468*f* to question 468, and/or response 470*f* to question 470, and/or response 472*f* to question 472, and/or response 474*e* to question 474, and/or response 476*f* to question 476, and/or response 480*a* to question 480, and/or response 482*b* to question 482.

In some embodiments, the online employee benefits enrollment server system and method 100 can select or calculate a third profile of a user 310 defined as "mindful planners". In this instance, the online employee benefits enrollment server system and method 100 can calculate and apply the profile based on a user's entry of a response 460*g* to question 460, and/or response 462*f* to question 462, and/or response 464*g* to question 464, and/or response 466*f* to question 466, and/or response 468*e* to question 468, and/or response 470*d* to question 470, and/or response 472*g* to question 472, and/or response 474*b* to question 474, and/or response 476*b* to question 476, and/or response 480*b* to question 480, and/or response 482*f* to question 482.

In some embodiments, the online employee benefits enrollment server system and method 100 can select or calculate a fourth profile of a user 310 defined as "simplicity seekers". In this instance, the online employee benefits enrollment server system and method 100 can calculate and apply the profile based on a user's entry of a response 460*c* to question 460, and/or response 462*a* to question 462, and/or response 464*e* to question 464, and/or response 466 to question 466, and/or response 468 to question 468, and/or response 470 to question 470, and/or response 472 to question 472, and/or response 474 to question 474, and/or response 476 to question 476, and/or response 480 to question 480, and/or response 482 to question 482.

In some embodiments, the online employee benefits enrollment server system and method 100 can provide an option to a user 310 to enter personal information to enable the online employee benefits enrollment server system and method 100 to customize one or more benefit elections. For example, FIG. 5 illustrates a display image 500 of a family page portion of an online employee benefits enrollment server system and method 100 according to one embodiment of the invention. Through this page, the user 310 can select dependent coverage 510 using a yes or no selector. The user 310 can select dependent coverage and provide the family member's personal information, including, but not limited to name and relationship, gender, and date of birth (e.g., using an entry window 520).

Figure 6:
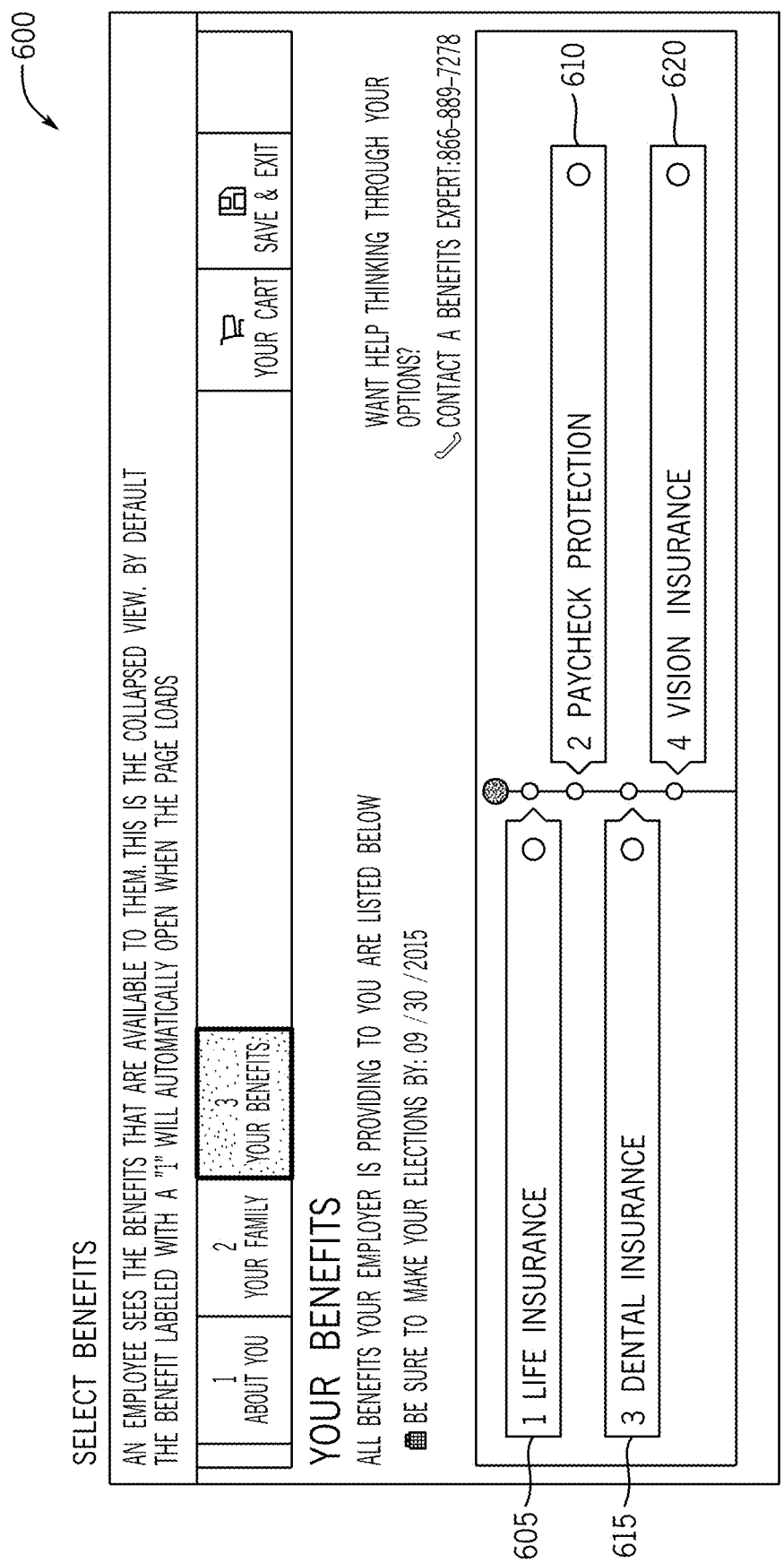
FIG. 6 shows a display image of the select benefits portion of an online employee benefits enrollment server system and method in accordance with some embodiments of the invention.

In some embodiments of the invention, the online employee benefits enrollment server system and method 100 can display options for benefits selection. For example, FIG. 6 shows a display image of the select benefits portion of an online employee benefits enrollment server system and method 100 according to one embodiment of the invention. In some embodiments, the online employee benefits enrollment server system and method can display one or more employee benefits using one or more benefits headers including for example life insurance 605, paycheck protection 610, dental insurance 615, and vision insurance 620. As used herein, paycheck protection (e.g., accessed or viewed through paycheck protection 610) can include one or more disability benefits and/or insurance. For example, in some embodiments, paycheck protection can comprise short-term disability payments and/or insurance. In some further embodiments, the paycheck protection can comprise long-term disability payments and/or insurance. Some embodiments include various combinations of short-term and long-term payments and/or insurance. As used herein, paycheck protection and short-term and/or long-term payments and/or insurance can be used interchangeably.

In some embodiments, the online employee benefits enrollment server system and method can also display information related to the user's progress with online benefits enrollment. For example, the online employee benefits enrollment server system and method 100 can display at least one graphical icon showing the user's status in the enrollment process. In some embodiments, a selectable "proceed to checkout" icon can also be displayed by the online employee benefits enrollment server system and method 100 to enable a user 310 to proceed with enrollment in one or more selected benefits.

Figure 7:
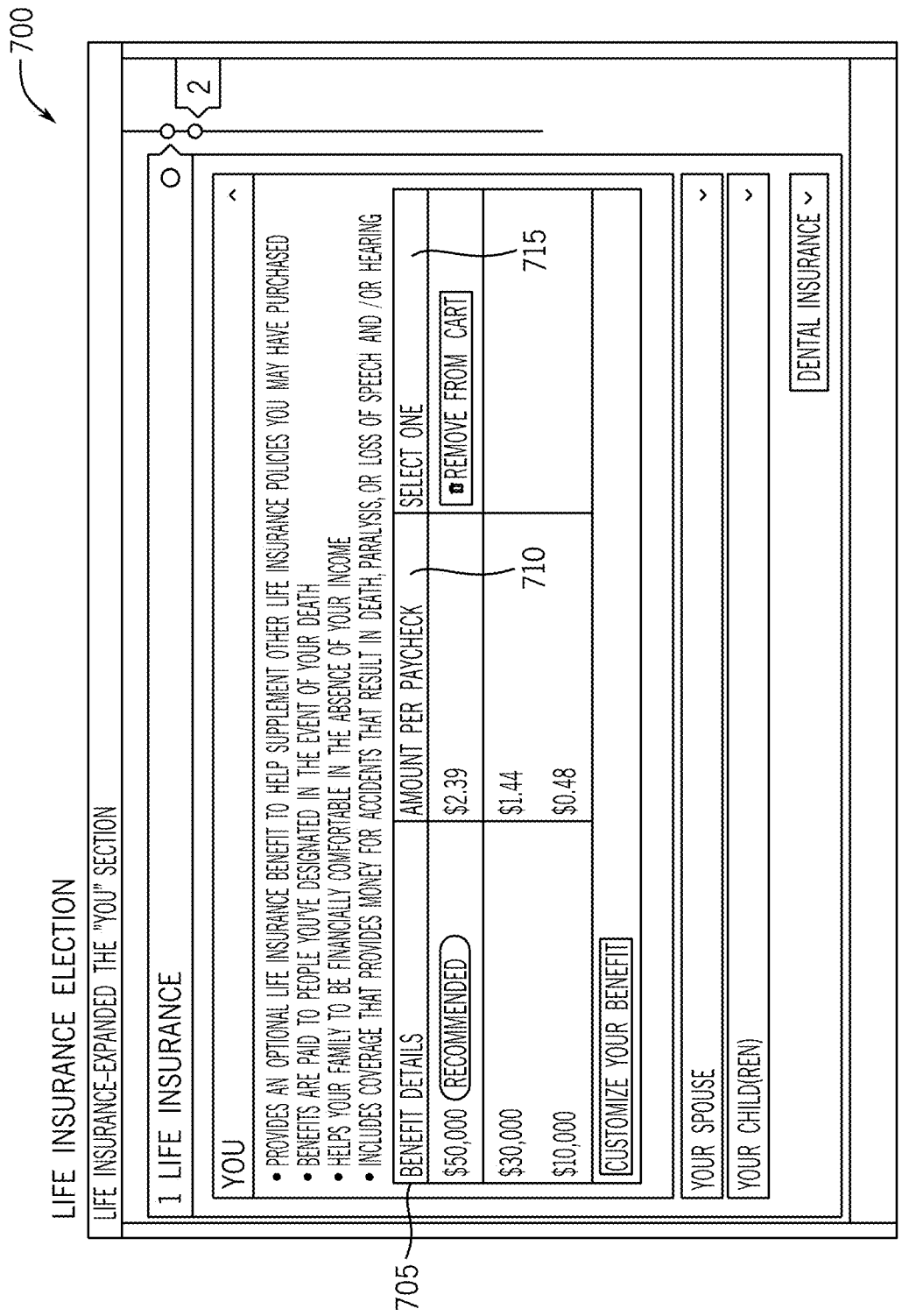
FIG. 7 shows a display image of an employee benefits portion of the online employee benefits enrollment server system and method in accordance with some embodiments of the invention.

In some embodiments, the online employee benefits enrollment server system and method can display details of one or more of the benefits selected in FIG. 6. For example, FIG. 7 shows a display image of an employee benefits portion of the online employee benefits enrollment server system and method 100 according to one embodiment of the invention. In this example, following a selection of the life insurance 605 icon in FIG. 6, the online employee benefits enrollment server system and method 100 can display expanded information on the life insurance benefit. In some embodiments, the online employee benefits enrollment server system and method 100 can display the benefit details and costs of each benefit, and a user 310 can select one or more of the benefits and/or deselect of remove any benefit added to the user's cart (shown in selection column 715). Some embodiments include a benefits details column 705 that can include a value of the benefit. Some embodiments also include a cost amount per paycheck column 710 illustrating the cost to the user 310 for any benefit shown in column 705.

Figure 8:
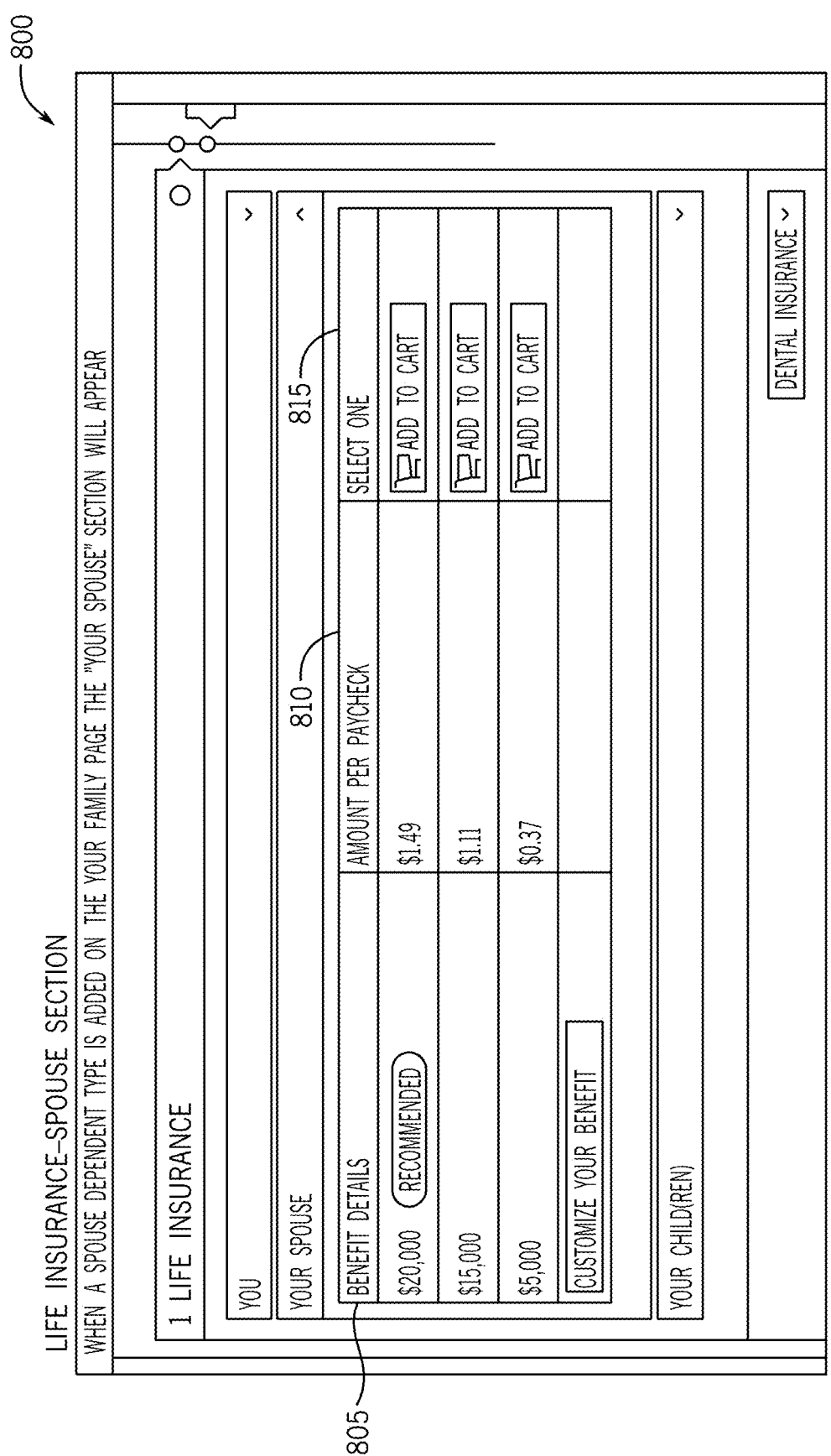
FIG. 8 illustrates an employee benefits display image for spouse life insurance benefits in accordance with some embodiments of the invention.

FIG. 8 illustrates an employee benefits display image 800 for spouse life insurance benefits in accordance with some embodiments of the invention. In this example, a user 310 can be enabled to access an option to review and select benefit options for a spouse using similar methods to those described above with respect to FIG. 7. In some embodiments, the online employee benefits enrollment server system and method 100 can display a benefit details column 805 and costs of each benefit (shown as amount per paycheck 810). Further, the user 310 can select one or more of the benefits for addition to the user's cart (shown in selection column 815). In some embodiments, the benefit details column 805 can include a value of the benefit.

Figure 9:
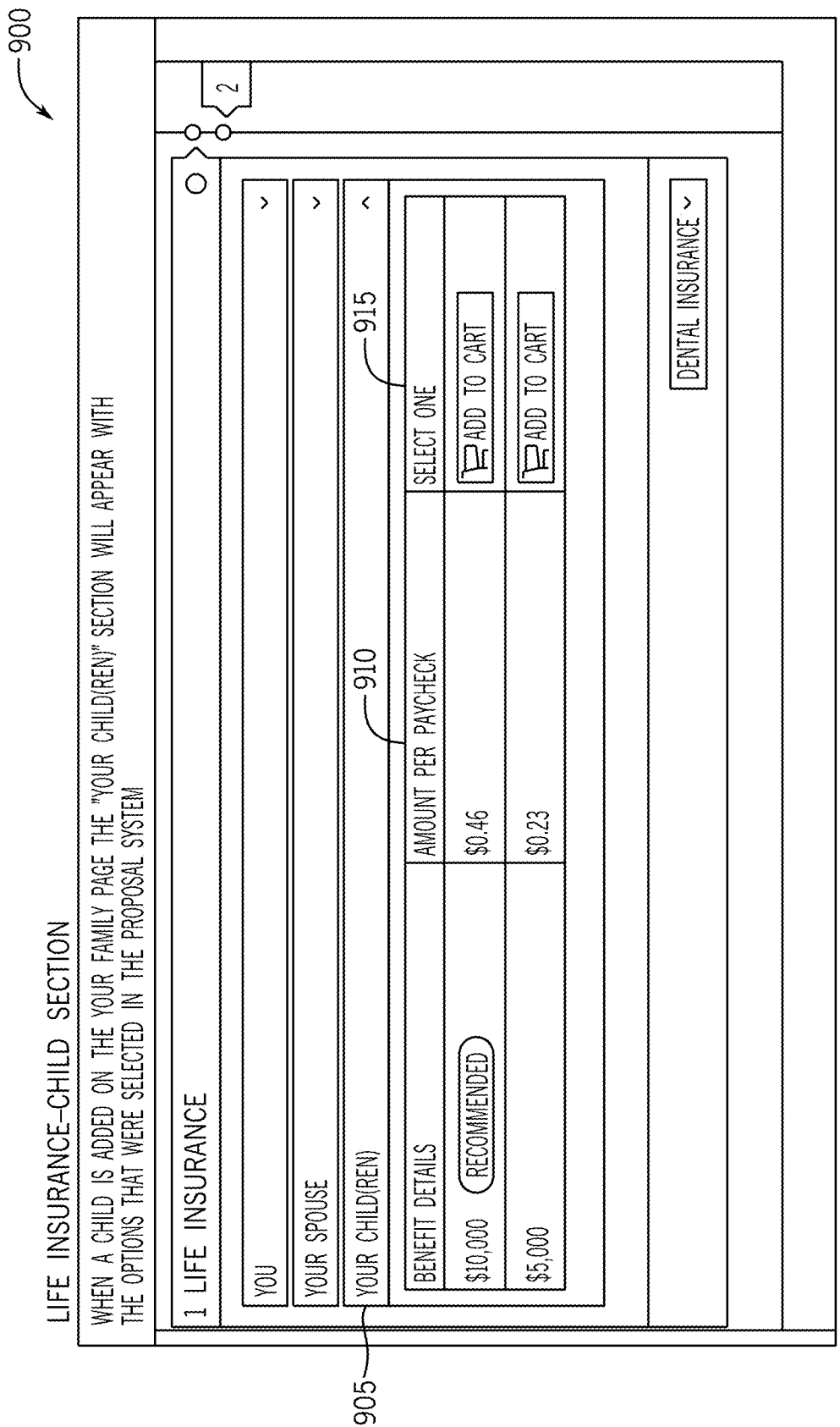
FIG. 9 illustrates an employee benefits display image for dependent life insurance benefits in accordance with some embodiments of the invention.

FIG. 9 illustrates an employee benefits display image 900 for dependent life insurance benefits in accordance with some embodiments of the invention. In this example, the online employee benefits enrollment server system and method 100 can provide a user 310 with an option to review and select benefit options for a child using similar methods to those described above with respect to FIG. 7. In some embodiments, the online employee benefits enrollment server system and method 100 can display a benefit details column 905 and costs of each benefit (shown as amount per paycheck 910). Further, the user 310 can select one or more of the benefits for addition to the user's cart (shown in selection column 915). In some embodiments, the benefit details column 905 can include a value of the benefit.

Figure 10:
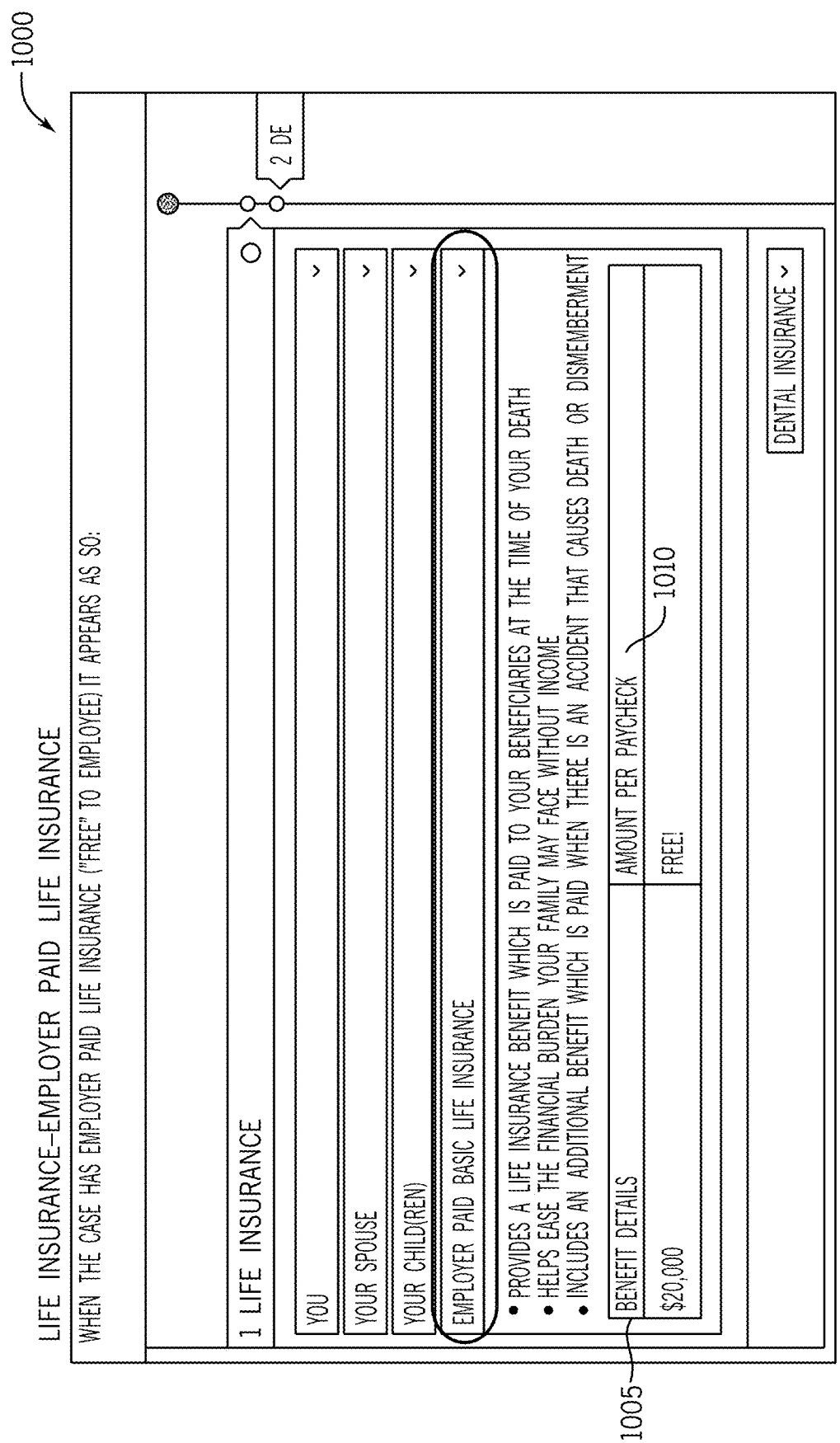
FIG. 10 illustrates an employee benefits display image for employer paid life insurance benefits in accordance with some embodiments of the invention.

Some embodiments of the invention include the display of benefits that are free with no direct cost the employee. In some embodiments, the online employee benefits enrollment server system and method 100 employer provided benefits include employer paid life insurance. For example, FIG. 10 illustrates an employee benefits display image 1000 for employer paid life insurance benefits in accordance with some embodiments of the invention. As illustrated in the example embodiments, the online employee benefits enrollment server system and method 100 can display information related to employer paid basic life insurance including benefit details (column 1005), and an amount per paycheck that equals zero (represented in column 1010).

In some embodiments, the online employee benefits enrollment server system and method 100 can provide a user 310 with additional options and benefits (e.g. dental insurance benefits). For example, FIG. 11 illustrates an employee benefits related display image 1100 for dental benefits in accordance with some embodiments of the invention. In this example, the online employee benefits enrollment server system and method 100 can display information related to optional dental benefit options. In some embodiments, the online employee benefits enrollment server system and method 100 can display the extent of coverage (shown as column 1107), benefit details (column 1109), and costs of each benefit (shown as cost per paycheck column 1111). In some further embodiments, the online employee benefits enrollment server system and method 100 can be provide a user 310 with an option to select one or more of the benefits using at least one "add to cart" icon in column 1105.

FIG. 12 illustrates an employee benefits related display image 1200 for vision benefits in accordance with some embodiments of the invention. The online employee benefits enrollment server system and method 100 can display information on the provided benefit, the benefit details, and the cost, including information on no cost options. In some embodiments, the online employee benefits enrollment server system and method 100 can display the extent of coverage (shown as column 1205), benefit details (column 1210), and costs of each benefit (shown as cost per paycheck column 1215). In some further embodiments, the online employee benefits enrollment server system and method 100 can provide a user 310 with an option to select one or more of the benefits using at least one "add to cart" icon in column 1217.

FIG. 13 shows a display image 1300 of a benefits selection portion of an online employee benefits enrollment server system and method 100 including paycheck protection options according to one embodiment of the invention. In some embodiments, the online employee benefits enrollment server system and method 100 can provide a user 310 with an option for paycheck protection. For example, in some embodiments, the online employee benefits enrollment server system and method 100 can display expanded information for paycheck protection benefit options. In some embodiments, the online employee benefits enrollment server system and method 100 can display the benefit details and costs of each benefit, and a user 310 can select one or more of the benefits using at least one "add to cart" icon. In some embodiments, the online employee benefits enrollment server system and method 100 can display the extent of coverage (shown as column 1310), benefit details (benefit payout 1312), and costs of each benefit (shown as cost per paycheck column 1314). In some further embodiments, the online employee benefits enrollment server system and method 100 can provide a user 310 with an option to select one or more of the benefits using at least one "add to cart" icon in column 1316.

Figure 14:
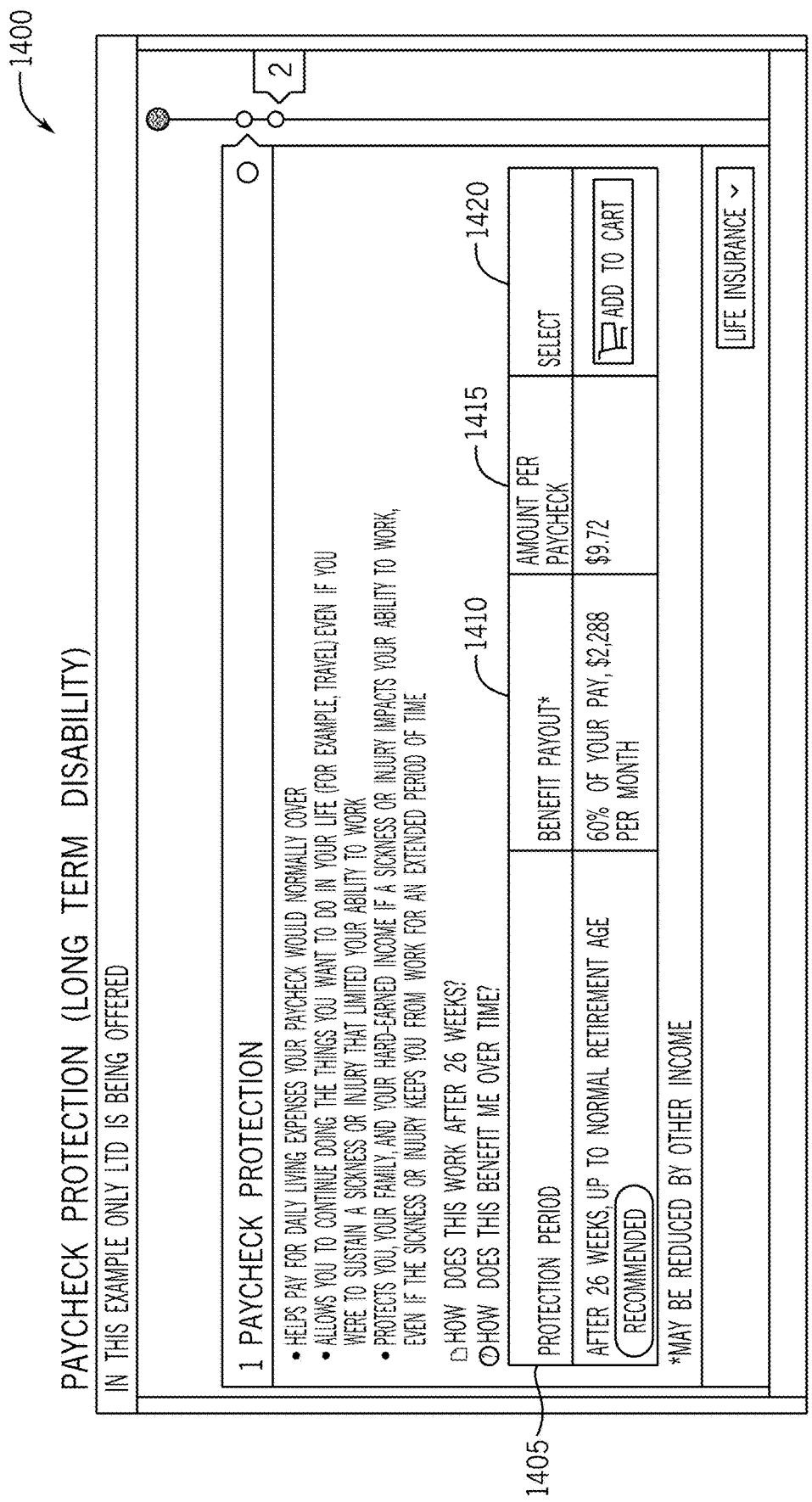
FIG. 14 shows a display image of a benefits selection portion of an online employee benefits enrollment server system and method including paycheck protection benefits for long term disability in accordance with some embodiments of the invention.

Further, in some embodiments, the online employee benefits enrollment server system and method 100 can also provide the user 310 with information as to how the benefit was previously selected by other users. Some embodiments leverage a financial services company's own data about customers and use various social media options to help "nudge" people throughout the process. These embodiments can help those persons who are reluctant to take advice from large financial services companies. Such persons want to hear what "people like them" would do. Some embodiments take a financial services company's data about customers (which can include data on millions of employees covered by the company's plans) and let the person enrolling know what people like them purchased. Therefore, if a single parent of two, aged in her thirties is enrolling, some embodiments would show that person what other single parents of similar age elected. For example, in some embodiments, information tab 1305 can provide a user 310 with details of whether other similar users have selected the benefit. FIG. 14 shows a display image 1400 of a benefits selection portion of an online employee benefits enrollment server system and method 100 including paycheck protection benefits for long term disability according to one embodiment of the invention. In some embodiments, the online employee benefits enrollment server system and method 100 can display the benefit details and costs of each benefit, and a user 310 can select one or more of the benefits using at least one "add to cart" icon. In some embodiments, the online employee benefits enrollment server system and method 100 can display the extent of coverage (shown as column 1405), benefit details (benefit payout 1410), and costs of each benefit (shown as cost per paycheck column 1415). In some further embodiments, the online employee benefits enrollment server system and method 100 can provide a user 310 with an option to select one or more of the benefits using at least one "add to cart" icon in column 1420.

FIG. 15 shows a display image of a benefits selection portion of an online employee benefits enrollment server system and method 100 including paycheck protection benefits for long and short term disability according to one embodiment of the invention. In some embodiments, the online employee benefits enrollment server system and method 100 can display the benefit details and costs of each benefit, and a user 310 can select one or more of the benefits using at least one "add to cart" icon. For example, in some embodiments, the online employee benefits enrollment server system and method 100 can display the extent of coverage (shown as column 1507), benefit details (benefit payout 1509), and costs of each benefit (shown as cost per paycheck column 1511). In some further embodiments, the online employee benefits enrollment server system and method 100 can provide a user 310 with an option to select one or more of the benefits using at least one "add to cart" icon in column 1513. Further, in some embodiments, the online employee benefits enrollment server system and method 100 can include statements, headers, banners, and/or related information within the user's interface comprising content based at least in part on the profile of the user 310, (i.e. based at least in part on the profile determined by the online employee benefits enrollment server system and method 100 using the user 310 diagnostic described earlier and shown in FIG. 4B). For example, as illustrated in FIG. 15, in some embodiments, the online employee benefits enrollment server system and method 100 can display a description of the advantages of selection one or more benefits in region 1505. In some further embodiments, the online employee benefits enrollment server system and method 100 can display a suggestion or recommendation for one or more election choices are actions. For example, as shown in FIGS. 7-9, and FIGS. 11-15, in some embodiments, system generated recommendations can be included and displayed as a recommended banner.

In some embodiments, the online employee benefits enrollment server system and method 100 can display selected benefits to the user 310. For example, FIG. 16 shows a display image 1600 of an employee's benefit shopping cart portion of the online employee benefits enrollment server system and method 100 according to one embodiment of the invention. In some embodiments of the invention, the online employee benefits enrollment server system and method 100 can display the product name, coverage information, benefits information, and costs to the user 310 including costs per benefit and total costs. In some embodiments, the online employee benefits enrollment server system and method 100 can enable the user 310 to add notes and to delete one or more selected benefits. In some embodiments, the online employee benefits enrollment server system and method 100 can display the benefits product column 1605 can display the selected benefits, the extent of coverage (shown as column 1607), benefit details (benefit payout 1609), and costs of each benefit (shown as cost per paycheck column 1611). In some further embodiments, the online employee benefits enrollment server system and method 100 can provide a user 310 with an option to delete one or more of the benefits using the at least one "add to cart" icon in column 1613. Selected benefits can be selected again at any time.

The online employee benefits enrollment server system and method 100 can display dates of specific events and/or deadlines. The online employee benefits enrollment server system and method 100 can provide an option to the user 310 to download or complete online any required forms (e.g., domestic partner forms, statement of health forms). The online employee benefits enrollment server system and method 100 can also provide a link to enable a user 310 to complete addition of one or more beneficiaries. For example, FIG. 17 illustrates a display image 1700 of benefits information and selection portion of an online employee benefits enrollment server system and method 100 including health questions according to one embodiment of the invention. In some embodiments of the invention, the online employee benefits enrollment server system and method 100 can be configured to gather some health or medical related information from the user 310. In some embodiments, the online employee benefits enrollment server system and method 100 can prompt the user 310 to provide the information in association with a benefit (e.g., for providing an additional life insurance coverage benefit). In some embodiments, some or all selected benefits can include benefit coverage at least partially dependent on the user 310 providing certain medical information as requested by the online employee benefits enrollment server system and method 100.

FIG. 18 illustrates a display image 1800 of a benefits selection confirmation forms page portion of the online employee benefits enrollment server system and method 100 according to one embodiment of the invention. In some embodiments, once the benefits election process is complete, any remaining steps that are required can be displayed on the user interface by the online employee benefits enrollment server system and method 100 can display. For example, in some embodiments of the invention, the online employee benefits enrollment server system and method 100 can be configured to gather some health or medical, or benefit related information from the user 310. In some embodiments, the online employee benefits enrollment server system and method 100 can prompt the user 310 to provide the information in association with a benefit (e.g., for providing an additional life insurance coverage benefit). In some embodiments, some or all selected benefits can include benefit coverage at least partially dependent on the user 310 providing certain medical information as requested by the online employee benefits enrollment server system and method 100. This information can include forms that can be completed by the user 310 electronically, or downloaded printed forms that the user 310 can completed and mail. In some embodiments, these can include health information and/or beneficiary information.

FIG. 19 shows a display image 1900 of a portion of a benefits information wrap-up and survey page of the online employee benefits enrollment server system and method 100 according to one embodiment of the invention. In some embodiments, the wrap-up and survey page can display a benefits start date. Further, in some embodiments, a feedback option can enable a user 310 to take a survey of the user's experience with the online employee benefits enrollment server system and method 100.

FIG. 20 shows a communication 2000 showing benefits information provided by the online employee benefits enrollment server system and method 100 to a user 310 according to one embodiment of the invention. In some embodiments, the online employee benefits enrollment server system and method 100 can provide a list of the benefit products selected (2010), the individuals covered by the selected benefits (2020), benefit details (2030), and cost per paycheck to the user 310 (2040). In some embodiments, the communication 2000 can comprise an email to the employee (e.g., sent after benefits enrollment is complete). In other embodiments, the communication 2000 can comprise a letter to the employee. In some further embodiments, the communication 2000 can be a rendered display visible to the employee.

Some embodiments can allow employees in a same employer group to converse within the experience or program with their colleagues (via chat or other social media venues) regarding what they are selecting. Other embodiments can allow employees from different employer groups to converse.

Some embodiments enable sharing of media content, such as sharing a video of a 25 year old saying how he didn't think he needed disability insurance, but then was injured and couldn't work, thus further explaining the value of the coverage. Accordingly, when someone who is in their 20s is enrolling, and doesn't think they need disability coverage, such content could help to provide a compelling story from others like him, perhaps convincing him to purchase the coverage. Some embodiments tailor the "people like me" concept by profile so that employees can see different components depending on which profile they fit.

Some embodiments can provide proactive benefits review and re-enrollment considerations. For example, when an employee completes their enrollment, some embodiments of the invention prompt the employee regarding when and how they would like a follow-up for a proactive benefits review (e.g. through e-mail, regular mail, text message, phone call, etc.). As a non-limiting example, if the enrolling employee is planning a wedding or is planning to have a child in the upcoming year, the employee can enter a date for follow up, and in some embodiments, provide options during follow up that might be appropriate for the employee's life event.

In some embodiments of the invention, the display of benefits information to a user 310 can vary based on a determination of the user's profile and any elected or non-elected benefit. For example, FIG. 21 illustrates a benefits summary display 2100 for a first profile employee of the online employee benefits enrollment server system and method in accordance with some embodiments of the invention. In some embodiments, information describing benefits can be displayed in information window 2110 and can relate to paycheck protection. Further, in some embodiments, a protection period 2120 can be displayed, along with benefit payout 2130, and the calculated amount per paycheck 2140. A selection column 2150 can be used to select a specific benefit choice displayed.

FIG. 22 illustrates a benefits summary display 2200 for a second profile employee of the online employee benefits enrollment server system and method in accordance with some embodiments of the invention. In some embodiments, the benefits summary display 2200 can comprise an information window 2210, and can include information related to life insurance. In some embodiments, benefit details 2220 can be displayed, along with amount per paycheck 2230, and selection column 2240

Figure 23:
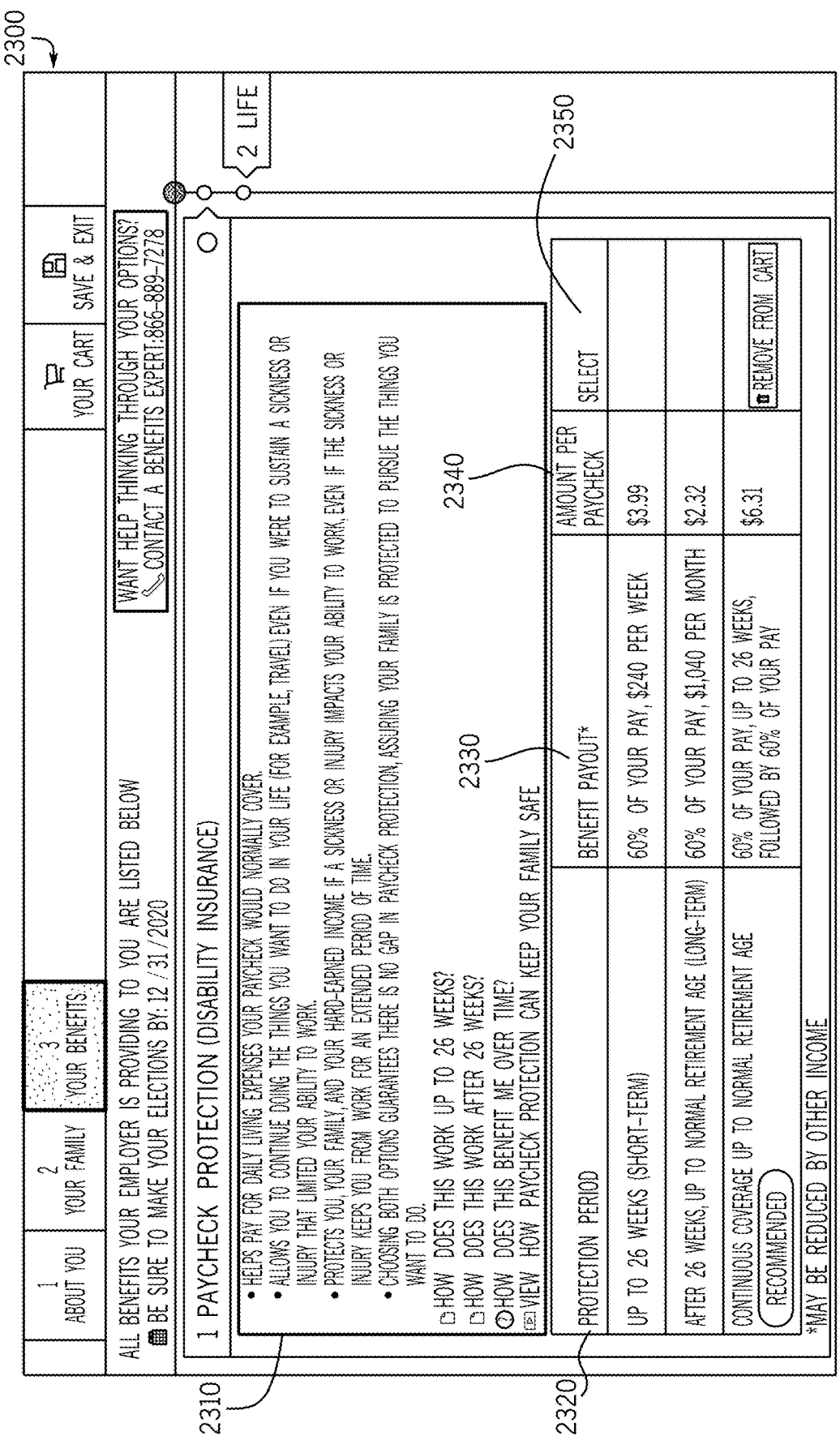
FIG. 23 illustrates a benefits summary for a third profile employee of the online employee benefits enrollment server system and method in accordance with some embodiments of the invention.

FIG. 23 illustrates a benefits summary display 2300 for a third profile employee of the online employee benefits enrollment server system and method in accordance with some embodiments of the invention. In some embodiments, the benefits summary display 2300 can comprise an information window 2310, and can include information related to a paycheck protection. In some embodiments, a protection period 2320 can be displayed, along with benefit payout 2330, and amount per paycheck 2340 information. One or more choice can be selected using the selection column 2350.

FIG. 24 illustrates a benefits summary display 2400 for a fourth profile employee of the online employee benefits enrollment server system and method in accordance with some embodiments of the invention. In some embodiments, the benefits summary display 2400 can comprise an information window 2410, and can include information related to a paycheck protection. In some embodiments, a protection period 2420 can be displayed, along with benefit payout 2430, and amount per paycheck 2440 information. One or more choice can be selected using the selection column 2450.

Any of the operations described herein that form part of the invention are useful machine operations. The invention also relates to a device or an apparatus for performing these operations. The apparatus can be specially constructed for the required purpose, such as a special purpose computer. When defined as a special purpose computer, the computer can also perform other processing, program execution or routines that are not part of the special purpose, while still being capable of operating for the special purpose. Alternatively, the operations can be processed by a general purpose computer selectively activated or configured by one or more computer programs stored in the computer memory, cache, or obtained over a network. When data is obtained over a network the data can be processed by other computers on the network, e.g. a cloud of computing resources.

The embodiments of the present invention can also be defined as a machine that transforms data from one state to another state. The data can represent an article, that can be represented as an electronic signal and electronically manipulate data. The transformed data can, in some cases, be visually depicted on a display, representing the physical object that results from the transformation of data. The transformed data can be saved to storage generally or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine. Computer-readable storage media, as used herein, refers to physical or tangible storage (as opposed to signals) and includes without limitation volatile and non-volatile, removable and non-removable storage media implemented in any method or technology for the tangible storage of information such as computer-readable instructions, data structures, program modules or other data.

Although method operations can be described in a specific order, it should be understood that other housekeeping operations can be performed in between operations, or operations can be adjusted so that they occur at slightly different times, or can be distributed in a system which allows the occurrence of the processing operations at various intervals associated with the processing, as long as the processing of the overlay operations are performed in the desired way.

It will be appreciated by those skilled in the art that while the invention has been described above in connection with particular embodiments and examples, the invention is not necessarily so limited, and that numerous other embodiments, examples, uses, modifications and departures from the embodiments, are intended to be encompassed by the invention.

The invention claimed is:

1. An employee benefits server system comprising:
a computing device comprising at least one processor;
a non-transitory computer readable medium, having stored thereon, instructions that when executed by the computing device, cause the computing device to perform operations where at least some of the operations occur within a local system or consumer device, the operations comprising:
associating the local system or consumer device with a benefits provider device, the benefits provider device including at least a benefits server and a diagnostic analysis database;
execution of a browser program to deliver personalized benefits information within a website delivered on the local system or consumer device, the browser program displaying at least one employee diagnostic survey, the at least one employee diagnostic survey comprising a surveyance of attitudes about finance;
enabling retrieval of benefits related input from a user using at least a wired communication interface or a wireless communication interface, the benefits input based on the content of the at least one employee diagnostic survey and comprising the attitudes about finance and employee preferences for saving, investing, insurance, and their financial future entered into the local system or consumer device;
causing the benefits server to access persona for the employee from the diagnostic analysis database, the persona selected by the benefits server from a plurality of predetermined individualized attributes based at least in part on at least a portion of the benefits related input, wherein the individualized attributes include employee profile determination data based on behavioral economics, the individualized attributes identifying a generalized profile of personal and financial characteristics and wherein the diagnostic analysis database comprises profile determination data based on financial psychology;
enabling retrieval of employee dependent information through the local system or consumer device using at least a wired communication interface or a wireless communication interface; and processing by the benefits server at least a portion of the benefits related input and employee persona to determine at least one employee benefit;

processing by the benefits server at least a portion of the benefits related input, the employee persona, and an analysis of different clusters of personas from other employees to determine at least one nudge to at least partially influence the employee's selection of the at least one employee benefit, wherein the analysis of the different clusters of personas from other employees is a cluster analysis performed using a plurality of key factors, wherein the different clusters of personas are correlated with variables on the survey for persona development of the employee persona to determine the at least one nudge;

causing the benefits server to display at least one benefits election webpage on the local system or consumer device, the at least one benefits election webpage including the personalized benefits information based at least in part on the benefits server processing the at least a portion of the benefits related input and the employee persona to determine the at least one employee benefit, wherein the at least one benefits election webpage includes the at least one nudge, the at least one nudge configured and arranged to at least partially influence the employee's selection of the at least one benefit.

2. The server system and method of claim 1, wherein the associating the local system or consumer device with a benefits provider device includes executing a two-step authentication process of the employee based on information provided by the employee.

3. The server system of claim 2, wherein the two-step authentication includes:
   processing a login of a user on the local system or consumer device using at least a wired communication interface or a wireless communication interface;
   processing identification information provided by the user;
   accessing an employee database and processing an identification match of the user with at least one employee record confirming the user as an employee; and
   coupling to at least one remote or non-local 3rd party database server and processing a test of authentication of the employee using background information from the 3rd party database server.

4. The system of claim 3, wherein a pre-enrollment email communication to the user precedes the login of the user.

5. The system of claim 1, wherein the attributes comprise or are related to at least one of a financial psychology and behavioral economics.

6. The system of claim 1, wherein the at least one nudge comprises at least one of a sound, a verbal announcement, a display of text, and a display of graphics.

7. The system of claim 1, wherein the website includes a display of an employer dashboard, the dashboard configured and arranged to enable an employer to manage an employee's enrollment.

8. The system of claim 7, wherein the employer dashboard includes at least one of a measure of the employees that have completed benefit enrollment, employees that completed benefit enrollment, and employees that have not initiated benefit enrollment.

9. The system of claim 7, wherein the employer dashboard is configured and arranged to enable an employer to send an acknowledgment or congratulations to employees that have completed enrollment.

10. The system of claim 7, wherein the employer dashboard is configured and arranged to enable an employer to send an encouragement message to employees that have partially completed and delayed completion of benefit enrollment.

11. The system of claim 7, wherein the employer dashboard is configured and arranged to enable an employer to send an announcement to employees that have not started enrollment.

12. The system of claim 1, wherein the at least one employee diagnostic survey comprises a surveyance of at least one of demographics, financial resources, assets and obligations, insurance product ownership, and investment product ownership.

13. The system of claim 1, wherein the at least one employee diagnostic survey further comprises questions related to at least one of the employees savings for retirement, financial advisor image, lifestyle characteristics, and preferences for information delivery style.

14. The system of claim 1, wherein the at least one benefits election webpage comprises benefits information or elections related to at least one of life insurance, paycheck protection, dental insurance, and vision insurance.

15. The system of claim 14, wherein the paycheck protection comprises at least one of short- term disability insurance and long-term disability insurance.

16. The system of claim 1, further comprising operations that:
   cause the benefits server to display an employee health survey; and
   enable retrieval of employee health information through the local system or consumer device using at least a wired communication interface or a wireless communication interface.

17. An employee benefits server system comprising:
   a computing device comprising at least one processor;
   a non-transitory computer readable medium, having stored thereon, instructions that when executed by the computing device, cause the computing device to perform operations where at least some of the operations occur within a local system or consumer device, the operations comprising:
   associating the local system or consumer device with a benefits provider device, the benefits provider device including at least a benefits server and a diagnostic analysis database;
   execution of a browser program to deliver personalized benefits information within a website delivered on the local system or consumer device, the browser program displaying at least one employee diagnostic survey, the at least one employee diagnostic survey comprising a surveyance of attitudes about finance;
   enabling retrieval of benefits related input from a user using at least a wired communication interface or a wireless communication interface, the benefits input based on the content of the at least one employee diagnostic survey and comprising the attitudes about finance and employee preferences for saving, investing, insurance, and their financial future entered into the local system or consumer device;
   processing by the benefits server at least a portion of the benefits related input and employee persona to determine at least one employee benefit;

processing by the benefits server at least a portion of the benefits related input, the employee persona, and an analysis of different clusters of personas from other employees to determine at least one nudge to at least partially influence the employee's selection of the at least one employee benefit, wherein the analysis of the different clusters of personas from other employees is a cluster analysis performed using a plurality of key factors, wherein the different clusters of personas are correlated with variables on the survey for persona development of the employee persona to determine the at least one nudge;

causing the benefits server to access persona for the employee from the diagnostic analysis database, the persona selected by the benefits server from a plurality of predetermined individualized attributes based at least in part on at least a portion of the benefits related input, wherein the individualized attributes include employee profile determination data based on behavioral economics, the individualized attributes identifying a generalized profile of personal and financial characteristics and wherein the diagnostic analysis database comprises profile determination data based on financial psychology;

enabling retrieval of employee dependent information through the local system or consumer device using at least a wired communication interface or a wireless communication interface; and causing the benefits server to display at least one benefits election webpage on the local system or consumer device, the at least one benefits election webpage including the personalized benefits information based at least in part on the benefits server processing the at least a portion of the benefits related input and the employee persona to determine the at least one employee benefit, wherein the at least one benefits election webpage includes the at least one nudge, the at least one nudge configured and arranged to at least partially influence the employee's selection of the at least one benefit;

wherein the surveyance of attitudes about finance comprises a plurality of statements for which the user indicates level of agreement or disagreement through a user interface of the website using a response bar including a scale of agreement and disagreement ranging from strongly agree to strongly disagree.

18. An employee benefits server system comprising:

a computing device comprising at least one processor;

a non-transitory computer readable medium, having stored thereon, instructions that when executed by the computing device, cause the computing device to perform operations where at least some of the operations occur within a local system or consumer device, the operations comprising:

associating the local system or consumer device with a benefits provider device, the benefits provider device including at least a benefits server and a diagnostic analysis database;

execution of a browser program to deliver personalized benefits information within a website delivered on the local system or consumer device, the browser program displaying at least one employee diagnostic survey;

enabling retrieval of benefits related input from a user using at least a wired communication interface or a wireless communication interface, the benefits input based on the content of the at least one employee diagnostic survey and comprising attitudes about finance and employee preferences for saving, investing, insurance, and their financial future entered into the local system or consumer device;

causing the benefits server to access persona for the employee from the diagnostic analysis database, the persona selected by the benefits server from a plurality of predetermined individualized attributes based at least in part on at least a portion of the benefits related input, wherein the individualized attributes include employee profile determination data based on behavioral economics, the individualized attributes identifying a generalized profile of personal and financial characteristics and wherein the diagnostic analysis database comprises profile determination data based on financial psychology;

enabling retrieval of employee dependent information through the local system or consumer device using at least a wired communication interface or a wireless communication interface; and processing by the benefits server at least a portion of the benefits related input and employee persona to determine at least one employee benefit;

processing by the benefits server at least a portion of the benefits related input, the employee persona, and an analysis of different clusters of personas from other employees to determine at least one nudge to at least partially influence the employee's selection of the at least one employee benefit, wherein the analysis of the different clusters of personas from other employees is a cluster analysis performed using a plurality of key factors, wherein the different clusters of personas are correlated with variables on the survey for persona development of the employee persona to determine the at least one nudge;

causing the benefits server to display at least one benefits election webpage on the local system or consumer device, the at least one benefits election webpage including the personalized benefits information based at least in part on the benefits server processing the at least a portion of the benefits related input and the employee persona to determine the at least one employee benefit, wherein the at least one benefits election webpage includes the at least one nudge which is customized based at least in part on the determined employee's persona, the at least one nudge configured and arranged to at least partially influence the employee's selection of the at least one benefit;

wherein the at least one nudge comprises a modified product description customized to the employee's persona.

* * * * *